United States Patent
Kocienda et al.

(10) Patent No.: US 11,928,161 B2
(45) Date of Patent: Mar. 12, 2024

(54) STRUCTURING AND PRESENTING EVENT DATA FOR USE WITH WEARABLE MULTIMEDIA DEVICES

(71) Applicant: Humane, Inc., San Francisco, CA (US)

(72) Inventors: Kenneth Luke Kocienda, Mill Valley, CA (US); Imran A. Chaudhri, San Francisco, CA (US)

(73) Assignee: Humane, Inc., San Francisco, CA (US)

( * ) Notice: Subject to any disclaimer, the term of this patent is extended or adjusted under 35 U.S.C. 154(b) by 0 days.

(21) Appl. No.: 17/687,591

(22) Filed: Mar. 4, 2022

(65) Prior Publication Data

US 2023/0281256 A1    Sep. 7, 2023

(51) Int. Cl.
| | | |
|---|---|---|
| *G06F 16/906* | (2019.01) | |
| *G06F 16/901* | (2019.01) | |
| *G06F 16/908* | (2019.01) | |
| *G06F 16/909* | (2019.01) | |
| *G06F 21/62*  | (2013.01) | |
| *G06N 20/00*  | (2019.01) | |

(52) U.S. Cl.
CPC .......... *G06F 16/906* (2019.01); *G06F 16/901* (2019.01); *G06F 16/908* (2019.01); *G06F 16/909* (2019.01); *G06F 21/6218* (2013.01); *G06N 20/00* (2019.01)

(58) Field of Classification Search
CPC .... G06F 16/901; G06F 16/906; G06F 16/908; G06F 16/909; G06N 20/00
See application file for complete search history.

(56) References Cited

U.S. PATENT DOCUMENTS

| | | | |
|---|---|---|---|
| 8,725,594 B1* | 5/2014 | Davies | G06F 16/10 |
| | | | 705/28 |
| 8,918,416 B1* | 12/2014 | Gross | G06F 16/353 |
| | | | 707/765 |
| 9,002,841 B2 | 4/2015 | McKevitt et al. | |
| 10,691,664 B1* | 6/2020 | Yap | G06F 3/0481 |
| 11,182,354 B1* | 11/2021 | Patel | G06F 16/116 |
| 2005/0165777 A1 | 7/2005 | Hurst-Hiller et al. | |

(Continued)

OTHER PUBLICATIONS

International Search Report and Written Opinion in International Appln. No. PCT/US2023/14494, dated Jun. 1, 2023, 12 pages.

(Continued)

*Primary Examiner* — William Spieler
(74) *Attorney, Agent, or Firm* — Fish & Richardson P.C.

(57) ABSTRACT

Systems, methods, devices and non-transitory, computer-readable storage media are disclosed for a wearable multimedia device and cloud computing platform with an application ecosystem for processing multimedia data captured by the wearable multimedia device. In some implementations, a first event data structure is obtained, the first event data structure including first content and a first label including a first plurality of nested categories. A second event data structure is obtained, the second event data structure including second content, and a second label including a second plurality of nested categories. The second label is different from the first label. A context of a mobile device is determined. At least one of the first content or the second content to present using the mobile device is determined. Using the mobile device, the at least one of the first content or the second content is presented.

21 Claims, 23 Drawing Sheets

(56) References Cited

U.S. PATENT DOCUMENTS

| | | | |
|---|---|---|---|
| 2008/0040488 A1* | 2/2008 | Gupta | H04L 67/5651 709/227 |
| 2008/0168055 A1* | 7/2008 | Rinearson | G06F 16/907 707/999.005 |
| 2009/0089288 A1* | 4/2009 | Petersen | H04L 67/52 707/999.009 |
| 2009/0152341 A1 | 6/2009 | Kasperkiewicz et al. | |
| 2013/0222133 A1* | 8/2013 | Schultz | G08B 25/08 340/539.11 |
| 2013/0249917 A1 | 9/2013 | Fanning et al. | |
| 2013/0254231 A1 | 9/2013 | Decker et al. | |
| 2014/0244652 A1 | 8/2014 | O'Neil | |
| 2014/0304247 A1 | 10/2014 | Fastlicht | |
| 2014/0358910 A1 | 12/2014 | Frigon et al. | |
| 2015/0046828 A1 | 2/2015 | Desai et al. | |
| 2015/0248222 A1 | 9/2015 | Stickler et al. | |
| 2016/0110374 A1* | 4/2016 | Wetherall | G06F 16/285 707/825 |
| 2017/0104802 A1 | 4/2017 | Chandran et al. | |
| 2017/0118576 A1* | 4/2017 | Sharifi | G06F 16/235 |
| 2017/0318075 A1 | 11/2017 | Liensberger et al. | |
| 2018/0011858 A1 | 1/2018 | Tekara Perrotta | |
| 2018/0150650 A1* | 5/2018 | Saunders | G16H 10/60 |
| 2018/0157699 A1 | 6/2018 | Sharma | |
| 2018/0232265 A1 | 8/2018 | Li et al. | |
| 2018/0276561 A1* | 9/2018 | Pasternack | G06F 16/353 |
| 2018/0330016 A1 | 11/2018 | Campbell et al. | |
| 2019/0019234 A1* | 1/2019 | Tseretopoulos | G06F 40/58 |
| 2019/0303385 A1 | 10/2019 | Ching et al. | |
| 2020/0073895 A1 | 3/2020 | Vira et al. | |
| 2020/0125575 A1* | 4/2020 | Ghoshal | G06V 10/40 |
| 2020/0304583 A1 | 9/2020 | Ruiz-Meraz et al. | |
| 2021/0011961 A1 | 1/2021 | Guan et al. | |
| 2021/0081720 A1* | 3/2021 | Polleri | G06K 9/6231 |
| 2021/0182350 A1* | 6/2021 | Gottumukkala | G06F 16/9532 |
| 2022/0066841 A1* | 3/2022 | Wei | G06F 16/9035 |
| 2022/0159345 A1 | 5/2022 | Andries et al. | |
| 2022/0182699 A1 | 6/2022 | Gordon et al. | |
| 2023/0281254 A1 | 9/2023 | Kocienda et al. | |

OTHER PUBLICATIONS

Kanel, "Sixth Sense Technology," Thesis for the Bachelor Degree of Engineering in Information and Technology, Centria University of Applied Sciences, May 2014, 46 pages.

Mann et al., "Telepointer: Hands-Free Completely Self Contained Wearable Visual Augmented Reality without Headwear and without any Infrastructural Reliance", IEEE Fourth International Symposium on Wearable Computers, Atlanta, GA, USA, Oct. 16-17, 2000, 4 pages.

Mann, "Wearable Computing: A First Step Toward Personal Imaging," IEEE Computer, Feb. 1997, 30(2):25-32.

Mann, "Wearable, tetherless computer-mediated reality," American Association of Artificial Intelligence Technical Report, Feb. 1996, 62-69, 8 pages.

Metavision.com [online], "Sensularity with a Sixth Sense," available on or before Apr. 7, 2015, via Internet Archive: Wayback Machine URL <http://web.archive.org/web/20170901072037/https://blog.metavision.com/professor-steve-mann-society-of-sensularity-with-a-sixth-sense/> retrieved on Apr. 25, 2023, URL <https://blog.metavision.com/professor-steve-mann-society-of-sensularity-with-a-sixth-sense/>, 4 pages.

Mistry et al., "WUW—wear Ur world: a wearable gestural interface", Proceedings of the 27th international conference Extended Abstracts on Human Factors in Computing Systems—CHI EA '09, Boston, MA, USA, Apr. 4-9, 2009, 6 pages.

Shetty et al., "Sixth Sense Technology," International Journal of Science and Research, Dec. 2014, 3(12):1068-1073.

* cited by examiner

| Flows | Users | Userdevices | Devices |
|---|---|---|---|
| flowid | userid | userid | deviceid |
| deviceid | deviceid | deviceid | started |
| start | email | | state |
| end | fname | | modified |
| lat | lname | | created |
| lon | | | |
| attributes | | | |
| entities | | | |

| ProcessingResults | Entities | EntityTypes | EntityAssociations |
|---|---|---|---|
| flowid | entityID | person | entity 1 |
| ai | userid | place | entity 2 |
| result | entityName | thing | |
| callback | entityType | event | |
| duration | entityAttribute | | |
| accuracy | | | |

```
┌─────────────────────────────────────────────────────────────────┐
│ Obtain a first event data structure including first content,    │
│ and a first label including a first plurality of nested         │
│ categories, the first plurality of nested categories including  │
│ at least a first category and a second category, the first      │
│ label associating the first content with the first category     │
│ and the second category                                         │
│                            2402                                 │
└─────────────────────────────────────────────────────────────────┘
                              ↓
┌─────────────────────────────────────────────────────────────────┐
│ Obtain a second event data structure including second content,  │
│ and a second label including a second plurality of nested       │
│ categories, the second plurality of nested categories including │
│ at least a third category, wherein the second label is          │
│ different from the first label and associates the second        │
│ content with the third category                                 │
│                            2404                                 │
└─────────────────────────────────────────────────────────────────┘
                              ↓
┌─────────────────────────────────────────────────────────────────┐
│             Determine a context of a mobile device              │
│                            2406                                 │
└─────────────────────────────────────────────────────────────────┘
                              ↓
┌─────────────────────────────────────────────────────────────────┐
│ Based on the context, the first label, and the second label,    │
│ determining at least one of the first content or the second     │
│ content to present using the mobile device                      │
│                            2408                                 │
└─────────────────────────────────────────────────────────────────┘
                              ↓
┌─────────────────────────────────────────────────────────────────┐
│ Present, using the mobile device, the at least one of the       │
│ first content or the second content.                            │
│                            2410                                 │
└─────────────────────────────────────────────────────────────────┘
```

FIG. 24

STRUCTURING AND PRESENTING EVENT DATA FOR USE WITH WEARABLE MULTIMEDIA DEVICES

TECHNICAL FIELD

This disclosure relates generally to structuring and presenting event data for use with mobile devices such as wearable multimedia devices.

BACKGROUND

High-precision laser scanners (e.g., MEMS scanners) have been developed that can turn any surface into a virtual interface (VI). For example, a laser-projected VI can be projected onto the palm of a user's hand or other surface. Three-dimensional (3D) depth sensors (e.g., a time of flight (TOF) camera) can be used to detect user gestures that are interacting with one or more VI elements projected on the surface. In the case of the user's palm, there is very little surface area in which to project a detailed VI. This limited space can limit the number and types of user interactions with the VI, and thus potentially limit the number and types of applications that rely on the VI for input and output.

SUMMARY

Systems, methods, devices, and non-transitory, computer-readable storage media are disclosed for processing event data for use with mobile devices, such as for presentation using a laser-projected VI associated with a mobile (e.g., wearable) multimedia device. Event data includes data such as device data (e.g., battery level), sensor data (e.g., images captured by a camera), social data (e.g., messages and recommended posts), assistance data (e.g., navigation directions), and news data (e.g., news articles and weather reports), among other suitable types of data. This data is provided in the form of "event data structures" (hereinafter referred to as "events") that are processed to categorize and present underlying content.

In some implementations according to this disclosure, an event includes labels that indicate one or more categories associated with the data corresponding to the event. The labels can indicate one, two, or more than two categories, in various combinations. The categories are used to organize and present events in a regularized manner. For example, a first label "sports.baseball" (including the categories "sports" and "baseball") is included in a baseball-related event, and a second label "device.wifi.state" (including the categories "device," "wifi," and "state") is included in an event relating to an on/off state of a wearable multimedia device's Wi-Fi system.

For example, in some implementations, events are added to a unified event stream that includes events having various different labels and provided by different sources. Data originating at the mobile device, data associated with user accounts such as email accounts and social network accounts, and other types of data are aggregated in the unified event stream. When the unified event stream is subsequently queried, results of the query can include different types of data from different sources, providing a user with a more complete understanding of the data available to them. As an example, two events having the respective labels "sports.baseball" and "device.wifi.state" can both be included in a unified event stream.

Instead of or in addition to unified event streams, some implementations of this disclosure feature narrower category-based event streams. Events sharing one or more common characteristics (e.g., one or more common categories indicated in the events' labels) but provided by different sources can be aggregated in an event stream that can be browsed by users, queried to identify relevant events, or otherwise used as a data source. Event streams can be associated with schema describing the data format of events aggregated in the event streams, and/or with access control data describing which users, event providers, and other entities can interact with the event streams, and which interactions are allowed. As an example, a "sports.baseball" event stream includes a series of events including the label "sports.baseball" or a narrower label thereof.

In some implementations, the labels included in events are structured in a nested manner. Categories of the labels are associated with one another in hierarchies as sub-categories and super-categories, and the labels share a common data format such that events from different sources can be aggregated together based on their respective hierarchies. For example, a first event stream can include events from different sources that share a common category at a first hierarchical level, while a second, narrower event stream includes events from different sources that share the common category at the first hierarchical level and also a second common category at a second, lower hierarchical level. As an example, a "device.wifi" event stream can include events having the respective labels "device.wifi.state," "device.wifi.currentnetwork," and "device.wifi.frequency."

Content included in events can be presented to users of mobile devices such as smartphones or wearable multimedia devices. In general, a wearable multimedia device can include a projector subsystem configured to present information visually to a user in the form of projected light. For example, the projector subsystem can project light onto a surface (e.g., a surface of a user's hand, such as the user's palm, or on a tabletop) according to a particular spatial and/or temporal pattern, such that the user perceives a VI with one or more user interface elements. Further, the user can perform gestures to interact with the VI.

The implementations described herein can provide various benefits. For instance, category-based labeling of events can allow for flexible collation, filtering, and grouping of events, such as for presentation of relevant events to users. Hierarchical labels can provide ordered, content-based grouping of events, indicating which event streams represent subsets/supersets of other event streams and simplifying event identification. Common label formats for events can allow events to be queried in a joint manner, such as in unified or other event streams, even when the events are provided by different sources, such as different device sensors and/or different third-party platforms. The grouping of events into event streams associated with access control data can improve the efficiency of regulating access to the events and can improve data security/privacy by regularizing access control. The association of schema data with event streams can reduce content presentation errors and can allow different types of events (corresponding to different labels/event streams) to be presented in different manners suitable for the different types of events.

Some aspects of this disclosure describe a computer-implemented method. The method includes receiving, from a first source, a first event data structure including a first nested category; receiving, from a second source, a second event data structure including a second nested category; receiving a query request including one or more search conditions; based at least on the one or more search conditions, querying a unified event stream including the first event data structure and the second event data structure; obtaining, based on the querying, a result including at least one of content of the first event data structure or content of the second event data structure; and presenting the result using a mobile device.

Implementations of this and other methods described herein can have any one or more of at least the following characteristics.

In some implementations, the method includes receiving, from a third source, a third event data structure including the first nested category. The unified event stream includes the third event data structure, and the result includes the content of the first event data structure and content of the third event data structure.

In some implementations, querying the unified event stream includes determining that the first nested category satisfies a first search condition of the one or more search conditions. The result includes the content of the first event data structure.

In some implementations, the method includes adding the first event data structure to a first event stream associated with the first nested category; and adding the second event data structure to a second event stream associated with the second nested category.

In some implementations, the method includes receiving a second query request including one or more additional search conditions; based at least on the one or more additional search conditions, querying the first event stream, to obtain a second result; and presenting the second result using the mobile device.

In some implementations, the method includes determining that the user follows an event stream associated with the first nested category; and in response to determining that the user follows the event stream associated with the first nested category, presenting content of the first event data structure using the mobile device.

In some implementations, the method includes presenting, using the mobile device, a visual representation of the unified event stream. The visual representation includes the content of the first event data structure and the content of the second event data structure.

In some implementations, the method includes receiving an access request to access at least one event data having the first nested category; accessing permission data associated with an event stream associated with the first nested category; determining, based on the permission data, that a provider of the access request has read access to the event stream associated with the first nested category; and, based at least on determining that the provider of the access request has read access to the event stream associated with the first nested category, providing the first event data structure to the provider of the access request.

In some implementations, the method includes accessing permission data associated with the first nested category; determining, based on the permission data, that the first source has write access to an event stream associated with the first nested category; and based at least on determining that the first source has write access to the event stream associated with the first nested category, adding the first event data structure to the event stream associated with the first nested category.

In some implementations, the method includes accessing schema data associated with an event stream associated with the first nested category; determining that a data format of the first event data structure conforms to a data format specified in the schema data; and based at least on determining that the data format of the first event data structure conforms to the data format specified in the schema data, adding the first event data structure to the event stream associated with the first nested category.

In some implementations, receiving the first event data structure includes receiving first data; determining that the first data does not conform to a data format associated with an event stream associated with the first nested category; converting the first data into the data format associated with the event stream associated with the first nested category, to obtain the first event data structure; and adding the first event data structure to the event stream associated with the first nested category.

In some implementations, the first source includes a first application running on the mobile device, and the second source includes a second application running on the mobile device.

In some implementations, the first source includes a first sensor of the mobile device, and the second source includes a second sensor of the mobile device.

In some implementations, receiving the first event data structure and the second event data structure includes receiving the first event data structure and the second event data structure at a server remote to the mobile device, the server being communicably coupled to the mobile device.

Some aspects of this disclosure describe another computer-implemented method. The method includes obtaining a first event data structure including first content and a first label including a first plurality of nested categories. The first plurality of nested categories includes at least a first category and a second category, the first label associating the first content with the first category and the second category. The method includes obtaining a second event data structure including second content and a second label including a second plurality of nested categories, the second plurality of nested categories including at least a third category. The second label is different from the first label and associates the second content with the third category. The method includes determining a context of a mobile device; based on the context, the first label, and the second label, determining at least one of the first content or the second content to present using the mobile device; and presenting, using the mobile device, the at least one of the first content or the second content.

Implementations of this and other methods described herein can have any one or more of at least the following characteristics.

In some implementations, the first plurality of nested categories represents a hierarchy of categories including the second category as a sub-category of the first category, and the first label associates the first content with the first category and the second category by providing information indicating that the first content corresponds to the second category as a sub-category of the first category.

In some implementations, the second plurality of nested categories further includes the first category and represents a hierarchy of categories with the third category being a sub-category of the first category in the hierarchy, and the second label associates the second content with the third category by providing information indicating that the second content corresponds to the third category as a sub-category of the first category.

In some implementations, the first label and the second label conform to a common data format.

In some implementations, the first label and the second label include at least one common nested category.

In some implementations, determining the at least one of the first content or the second content to present includes: based on the first plurality of nested categories and the second plurality of nested categories, assigning a first relevance score to the first content and a second relevance score to the second content; and determining the at least one of the first content or the second content to present based on the first relevance score and the second relevance score.

In some implementations, the method includes providing the context, the first label, and the second label to a machine learning model as inputs; and obtaining a first relevance score and a second relevance score as outputs of the machine learning model.

In some implementations, the method includes receiving a request to access at least one event data structure having the first label; accessing permission data associated with the first plurality of nested categories; determining, based on the permission data, that a provider of the request has read access to an event stream associated with the first plurality of nested categories; and, based on determining that the provider of the request has read access to the event stream associated with the first plurality of nested categories, providing the first event data structure to the provider of the request.

In some implementations, the method includes receiving the first event data structure; accessing permission data associated with the first plurality of nested categories; determining, based on the permission data, that a provider of the first event data structure has write access to an event stream associated with the first plurality of nested categories; and based on determining that the provider of the first event data structure has write access to the event stream associated with the first plurality of nested categories, adding the first event data structure to the event stream associated with the first plurality of nested categories.

In some implementations, the method includes receiving the first event data structure; accessing schema data associated with the first plurality of nested categories; determining that a data format of the first event data structure conforms to a data format specified in the schema data; and based on determining that the data format of the first event data structure conforms to the data format specified in the schema data, adding the first event data structure to an event stream associated with the first plurality of nested categories.

In some implementations, the method includes receiving first data; determining that the first data does not conform to a data format associated with the first plurality of nested categories; converting the first data into the data format associated with the first plurality of nested categories, to obtain the first event data structure; and adding the first event data structure to an event stream associated with the first plurality of nested categories.

In some implementations, the context includes at least one of a current time, a current location of the mobile device, a pose of the user, an action being performed by the user, a social situation of the user, or a subscription status of the user with respect to at least one of the first label or the second label.

In some implementations, the first plurality of nested categories includes a category indicating that the first content is associated with one of an operational state of the mobile device, or a particular interest category.

In some implementations, obtaining the first event data structure includes obtaining the first content; providing the first content to a machine learning model as an input; and obtaining, as an output of the machine learning model, the first label.

In some implementations, obtaining the first event data structure includes obtaining the first content and the first label using an application programming interface.

In some implementations, the first event data structure is obtained at the mobile device using a first application running on the mobile device, and the second event data structure is obtained at the mobile device using a second application running on the mobile device.

In some implementations, the method includes receiving the first event data structure and the second event data structure at a server remote to the mobile device, the server being communicably coupled to the mobile device.

In some implementations, the first, second, and third categories represent a plurality of digital object types presentable using the mobile device.

In some implementations, the first content and the second content correspond to different digital object types of the plurality of digital object types.

These and other methods described in this disclosure may be implemented at least as methods, systems, devices, and non-transitory, computer-readable storage media. The details of the disclosed implementations are set forth in the accompanying drawings and the description below. Other features, objects and advantages are apparent from the description, drawings and claims.

DESCRIPTION OF DRAWINGS

FIG. 5 illustrates data objects used by the data processing system of FIG. 2, according to some implementations of this disclosure.

FIGS. 23-24 are flow diagrams of examples of processes, according to some implementations of this disclosure.

The same reference symbol used in various drawings indicates like elements.

DETAILED DESCRIPTION

Example Wearable Multimedia Device

Figure 1:
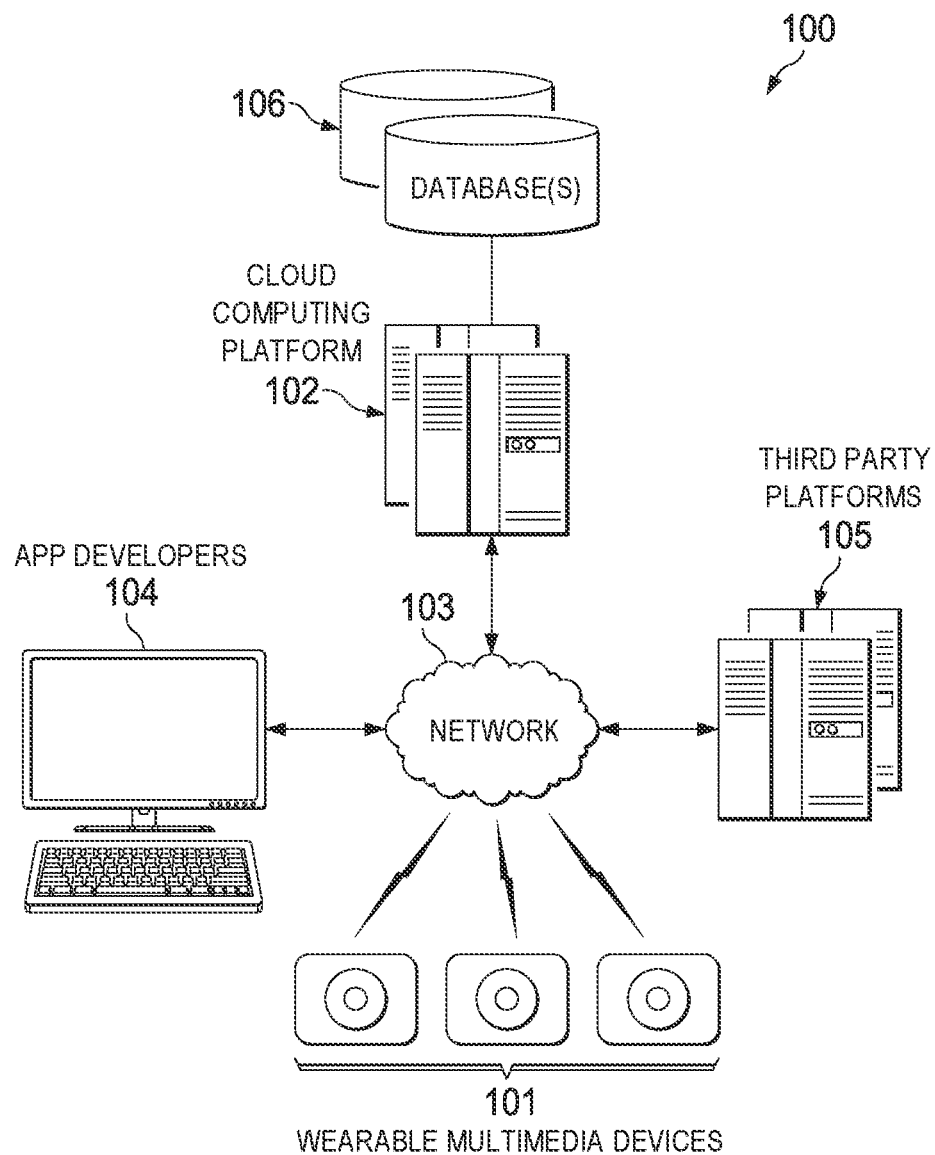
FIG. 1 is a block diagram of an operating environment for a wearable multimedia device and cloud computing platform with an application ecosystem for processing multimedia data captured by the wearable multimedia device, according to some implementations of this disclosure

The features and processes described herein can be implemented on a wearable multimedia device. In some implementations, the wearable multimedia device is a lightweight, small form factor, battery-powered device that can be attached to a user's clothing or an object using a tension clasp, interlocking pin back, magnet, or any other attachment mechanism. The wearable multimedia device includes a digital image capture device (e.g., a camera with a 180° FOV with optical image stabilizer (OIS)) that allows a user to spontaneously and/or continuously capture multimedia data (e.g., video, audio, depth data, biometric data) of life events ("moments") and document transactions (e.g., financial transactions) with minimal user interaction or device set-up. The multimedia data ("context data") captured by the wireless multimedia device is uploaded to a cloud computing platform with an application ecosystem that allows the context data to be processed, edited and formatted by one or more applications (e.g., Artificial Intelligence (AI) applications) into any desired presentation format (e.g., single image, image stream, video clip, audio clip, multimedia presentation, or image gallery) that can be downloaded and replayed on the wearable multimedia device and/or any other playback device. For example, the cloud computing platform can transform video data and audio data into any desired filmmaking style (e.g., documentary, lifestyle, candid, photojournalism, sport, street) specified by the user.

In some implementations, the context data is processed by server computer(s) of the cloud computing platform based on user preferences. For example, images can be color graded, stabilized and cropped perfectly to the moment the user wants to relive based on the user preferences. The user preferences can be stored in a user profile created by the user through an online account accessible through a website or portal, or the user preferences can be learned by the platform over time (e.g., using machine learning). In some implementations, the cloud computing platform is a scalable distributed computing environment. For example, the cloud computing platform can be a distributed streaming platform (e.g., Apache Kafka™) with real-time streaming data pipelines and streaming applications that transform or react to streams of data.

In some implementations, the user can start and stop a context data capture session on the wearable multimedia device with a simple touch gesture (e.g., a tap or swipe), by speaking a command or any other input mechanism. All or portions of the wearable multimedia device can automatically power down when it detects that it is not being worn by the user using one or more sensors (e.g., proximity sensor, optical sensor, accelerometers, gyroscopes).

The context data can be encrypted and compressed and stored in an online database associated with a user account using any desired encryption or compression technology. The context data can be stored for a specified period of time that can be set by the user. The user can be provided through a website, portal or mobile application with opt-in mechanisms and other tools for managing their data and data privacy.

In some implementations, the context data includes point cloud data to provide three-dimensional (3D) surface mapped objects that can be processed using, for example, augmented reality (AR) and virtual reality (VR) applications in the application ecosystem. The point cloud data can be generated by a depth sensor (e.g., LiDAR or Time of Flight (TOF)) embedded on the wearable multimedia device.

In some implementations, the wearable multimedia device includes a Global Navigation Satellite System (GNSS) receiver (e.g., Global Positioning System (GPS)) and one or more inertial sensors (e.g., accelerometers, gyroscopes) for determining the location and orientation of the user wearing the device when the context data was captured. In some implementations, one or more images in the context data can be used by a localization application, such as a visual odometry application, in the application ecosystem to determine the position and orientation of the user.

In some implementations, the wearable multimedia device can also include one or more environmental sensors, including but not limited to: an ambient light sensor, magnetometer, pressure sensor, voice activity detector, etc. This sensor data can be included in the context data to enrich a content presentation with additional information that can be used to capture the moment.

In some implementations, the wearable multimedia device can include one or more biometric sensors, such as a heart rate sensor, fingerprint scanner, etc. This sensor data can be included in the context data to document a transaction or to indicate the emotional state of the user during the moment (e.g., elevated heart rate could indicate excitement or fear).

In some implementations, the wearable multimedia device includes a headphone jack connecting a headset or earbuds, and one or more microphones for receiving voice command and capturing ambient audio. Instead or additionally, in some implementations, the wearable multimedia device includes short range communication technology, including but not limited to Bluetooth, IEEE 802.15.4 (ZigBee™) and near field communications (NFC). The short range communication technology can be used to wirelessly connect to a wireless headset or earbuds in addition to, or in place of the headphone jack, and/or can wirelessly connect to any other external device (e.g., a computer, printer, projector, television and other wearable devices).

In some implementations, the wearable multimedia device includes a wireless transceiver and communication protocol stacks for a variety of communication technologies, including Wi-Fi, 3G, 4G, and/or 5G communication technologies. In some implementations, the headset or earbuds also include sensors (e.g., biometric sensors, inertial sensors) that provide information about the direction the user is facing, to provide commands with head gestures or playback of spatial audio, etc. In some implementations, the camera direction can be controlled by the head gestures, such that the camera view follows the user's view direction. In some implementations, the wearable multimedia device can be embedded in or attached to the user's glasses.

In some implementations, the wearable multimedia device includes a projector (e.g., a laser projector) or other digital projection technology (e.g., Liquid Crystal on Silicon (LCoS or LCOS), Digital Light Processing (DLP) or Liquid Chrystal Display (LCD) technology), or can be wired or wirelessly coupled to an external projector, that allows the user to replay a moment on a surface such as a wall or table top or on a surface of the user's hand (e.g., the user's palm). Instead or additionally, in some implementations, the wearable multimedia device includes an output port that can connect to a projector or other output device.

In some implementations, the wearable multimedia capture device includes a touch surface responsive to touch gestures (e.g., a tap, multi-tap or swipe gesture). The wearable multimedia device may include a small display for presenting information and one or more light indicators to indicate on/off status, power conditions or any other desired status.

In some implementations, the cloud computing platform can be driven by context-based gestures (e.g., air gesture) in combination with speech queries, such as the user pointing to an object in their environment and saying: "What is that building?" The cloud computing platform uses the air gesture to narrow the scope of the viewport of the camera and isolate the building. One or more images of the building are captured and optionally cropped (e.g., to protect privacy) and sent to the cloud computing platform where an image recognition application can run an image query and store or return the results to the user. Air and touch gestures can also be performed on a projected ephemeral display, for example, responding to user interface elements projected on a surface.

In some implementations, the context data can be encrypted on the device and on the cloud computing platform so that only the user or any authorized viewer can relive the moment on a connected screen (e.g., smartphone, computer, television, etc.) or as a projection on a surface. An example architecture for the wearable multimedia device is described in reference to FIG. 8.

In addition to personal life events, the wearable multimedia device simplifies the capture of financial transactions that are currently handled by smartphones. The capture of every day transactions (e.g., business transactions, micro transactions) is made simpler, faster, and more fluid by using sight assisted contextual awareness provided by the wearable multimedia device. For example, when the user engages in a financial transaction (e.g., making a purchase), the wearable multimedia device will generate data memorializing the financial transaction, including a date, time, amount, digital images or video of the parties, audio (e.g., user commentary describing the transaction) and environment data (e.g., location data). The data can be included in a multimedia data stream sent to the cloud computing platform, where it can be stored online and/or processed by one or more financial applications (e.g., financial management, accounting, budget, tax preparation, inventory, etc.).

In some implementations, the cloud computing platform provides graphical user interfaces on a website or portal that allow various third party application developers to upload, update, and manage their applications in an application ecosystem. Some example applications can include but are not limited to: personal live broadcasting (e.g., Instagram™ Life, Snapchat™), senior monitoring (e.g., to ensure that a loved one has taken their medicine), memory recall (e.g., showing a child's soccer game from last week), and personal guide (e.g., AI enabled personal guide that knows the location of the user and guides the user to perform an action).

In some implementations, the wearable multimedia device includes one or more microphones and a headset. In some implementations, the headset wire includes the microphone. In some implementations, a digital assistant is implemented on the wearable multimedia device that responds to user queries, requests and commands. For example, the wearable multimedia device worn by a parent captures moment context data for a child's soccer game, and in particular a "moment" where the child scores a goal. The user can request (e.g., using a speech command) that the platform create a video clip of the goal and store it in their user account. Without any further actions by the user, the cloud computing platform identifies the correct portion of the moment context data (e.g., using face recognition, visual or audio cues) when the goal is scored, edits the moment context data into a video clip, and stores the video clip in a database associated with the user account.

In some implementations, the wearable multimedia device can include photovoltaic surface technology to sustain battery life and inductive charging circuitry (e.g., Qi) to allow for inductive charging on charge mats and wireless over-the-air (OTA) charging.

In some implementations, the wearable multimedia device is configured to magnetically couple or mate with a rechargeable portable battery pack. The portable battery pack includes a mating surface that has permanent magnet (e.g., N pole) disposed thereon, and the wearable multimedia device has a corresponding mating surface that has permanent magnet (e.g., S pole) disposed thereon. Any number of permanent magnets having any desired shape or size can be arranged in any desired pattern on the mating surfaces.

The permanent magnets hold portable battery pack and wearable multimedia device together in a mated configuration with clothing (e.g., a user's shirt) in between. In some implementations, the portable battery pack and wearable multimedia device have the same mating surface dimensions, such that there is no overhanging portion when in a mated configuration. A user magnetically fastens the wearable multimedia device to their clothing by placing the portable battery pack underneath their clothing and placing the wearable multimedia device on top of portable battery pack outside their clothing, such that permanent magnets attract each other through the clothing.

In some implementations, the portable battery pack has a built-in wireless power transmitter which is used to wirelessly power the wearable multimedia device while in the mated configuration using the principle of resonant inductive coupling. In some implementations, the wearable multimedia device includes a built-in wireless power receiver which is used to receive power from the portable battery pack while in the mated configuration.

System Overview

FIG. 1 is a block diagram of an operating environment for a wearable multimedia device and cloud computing platform with an application ecosystem for processing multimedia data captured by the wearable multimedia device, according to some implementations. Operating environment 100 includes wearable multimedia devices 101, cloud computing platform 102, network 103, application ("app") developers 104 and third party platforms 105. Cloud computing platform 102 is coupled to one or more databases 106 for storing context data uploaded by wearable multimedia devices 101.

As previously described, wearable multimedia devices 101 are lightweight, small form factor, battery-powered devices that can be attached to a user's clothing or an object using a tension clasp, interlocking pin back, magnet or any other attachment mechanism. Wearable multimedia devices 101 include a digital image capture device (e.g., a camera with a 180° FOV and OIS) that allows a user to spontaneously capture multimedia data (e.g., video, audio, depth data) of "moments" and document every day transactions (e.g., financial transactions) with minimal user interaction or device set-up. The context data captured by wearable multimedia devices 101 are uploaded to cloud computing platform 102. Cloud computing platform 102 includes an application ecosystem that allows the context data to be processed, edited and formatted by one or more server side applications into any desired presentation format (e.g., single image, image stream, video clip, audio clip, multimedia presentation, images gallery) that can be downloaded and replayed on the wearable multimedia device and/or other playback device.

By way of example, at a child's birthday party a parent can clip the wearable multimedia device on their clothing (or attached the device to a necklace or chain and wear around their neck) so that the camera lens is facing in their view direction. The camera includes a 180° FOV that allows the camera to capture almost everything that the user is currently seeing. The user can start recording by simply tapping the surface of the device or pressing a button or speaking a command. No additional set-up is required. A multimedia data stream (e.g., video with audio) is recorded that captures the special moments of the birthday (e.g., blowing out the candles). This "context data" is sent to cloud computing platform 102 in real-time through a wireless network (e.g., Wi-Fi, cellular). In some implementations, the context data is stored on the wearable multimedia device so that it can be uploaded at a later time. Instead or additionally, in some implementations, the user can transfer the context data to another device (e.g., personal computer hard drive, smartphone, tablet computer, thumb drive) and upload the context data to cloud computing platform 102 at a later time using an application.

In some implementations, the context data is processed by one or more applications of an application ecosystem hosted and managed by cloud computing platform 102. Applications can be accessed through their individual application programming interfaces (APIs). A custom distributed streaming pipeline is created by cloud computing platform 102 to process the context data based on one or more of the data type, data quantity, data quality, user preferences, templates and/or any other information to generate a desired presentation based on user preferences. In some implementations, machine learning technology can be used to automatically select suitable applications to include in the data processing pipeline with or without user preferences. For example, historical user context data stored in a database (e.g., NoSQL database) can be used to determine user preferences for data processing using any suitable machine learning technology (e.g., deep learning or convolutional neural networks).

In some implementations, the application ecosystem can include third party platforms 105 that process context data. Secure sessions are set-up between cloud computing platform 102 and third party platforms 105 to send/receive context data. This design allows third party app providers to control access to their application and to provide updates. Instead or additionally, in some implementations, the applications are run on servers of cloud computing platform 102 and updates are sent to cloud computing platform 102. In the latter implementations, app developers 104 can use an API provided by cloud computing platform 102 to upload and update applications to be included in the application ecosystem.

Example Data Processing System

Figure 2:
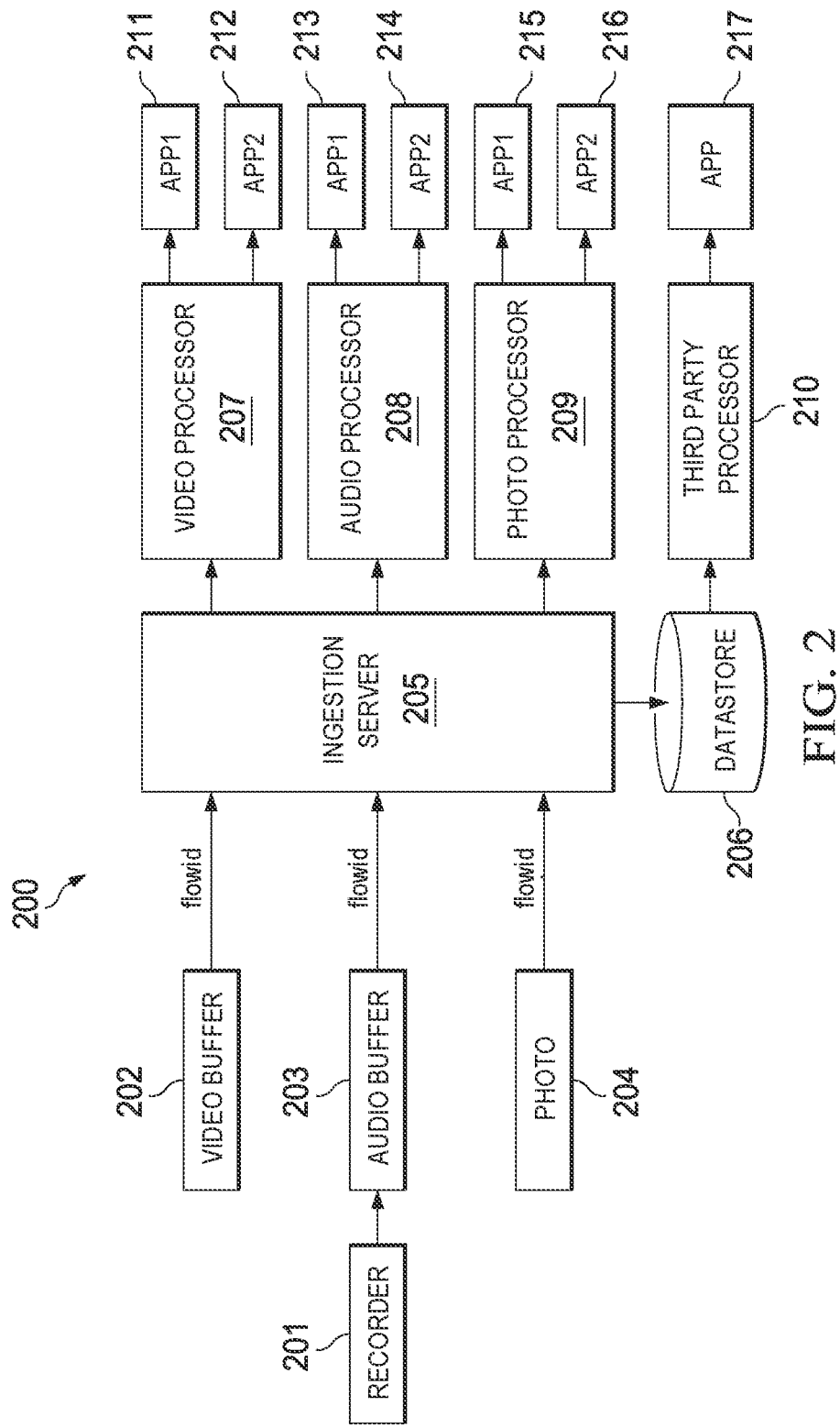
FIG. 2 is a block diagram of a data processing system implemented by the cloud computing platform of FIG. 1, according to some implementations of this disclosure.

FIG. 2 is a block diagram of a data processing system implemented by the wearable multimedia device and the cloud computing platform of FIG. 1, according to some implementations. Data processing system 200 includes recorder 201, video buffer 202, audio buffer 203, photo buffer 204, ingestion server 205, data store 206, video processor 207, audio processor 208, photo processor 209, and third party processor 210.

A recorder 201 (e.g., a software application) running on a wearable multimedia device records video, audio and photo data ("context data") captured by a camera and audio subsystem, and stores the data in buffers 202, 203, 204, respectively. This context data is then sent (e.g., using wireless OTA technology) to ingestion server 205 of cloud computing platform 102. In some implementations, the data can be sent in separate data flow each with a unique flow identifier (flowid). The data flows are discrete pieces of data that may include the following example attributes: location (e.g., latitude, longitude), user, audio data, video stream of varying duration, and N number of photos. A data flow can have a duration of 1 to MAXFLOW_LEN seconds, where in this example MAXFLOW_LEN=20 seconds.

Ingestion server 205 ingests the data flows and creates a flow record in data store 206 to store the results of processors 207-209. In some implementations, the audio flow is processed first and is used to determine the other data flows that are needed. Ingestion server 205 sends the data flows to the appropriate processor 207-209 based on the flowid. For example, the video flow is sent to video processor 207, the audio flow is sent to audio processor 208 and the photo flow is sent to photo processor 209. In some implementations, at least a portion of data collected from the wearable multimedia device (e.g., image data) is processed into metadata and encrypted so that it can be further processed by a given application and sent back to the wearable multimedia device or other device.

Processors 207-209 can run proprietary or third party applications as previously described. For example, video processor 207 can be a video processing server that sends raw video data stored in video buffer 202 to a set of one or more image processing/editing applications 211, 212 based on user preferences or other information. Processor 207 sends requests to applications 211, 212, and returns the results to ingestion server 205. In some implementations, third party processor 210 can process one or more of the data flow using its own processor and application 217. In another example, audio processor 208 can be an audio processing server that sends speech data stored in audio buffer 203 to speech-to-text converter applications 213, 214. In another example, photo processor 209 can be an image processing server that sends image data stored in photo buffer 204 to image processing applications 215, 216.

Example Scene Identification Application

Figure 3:
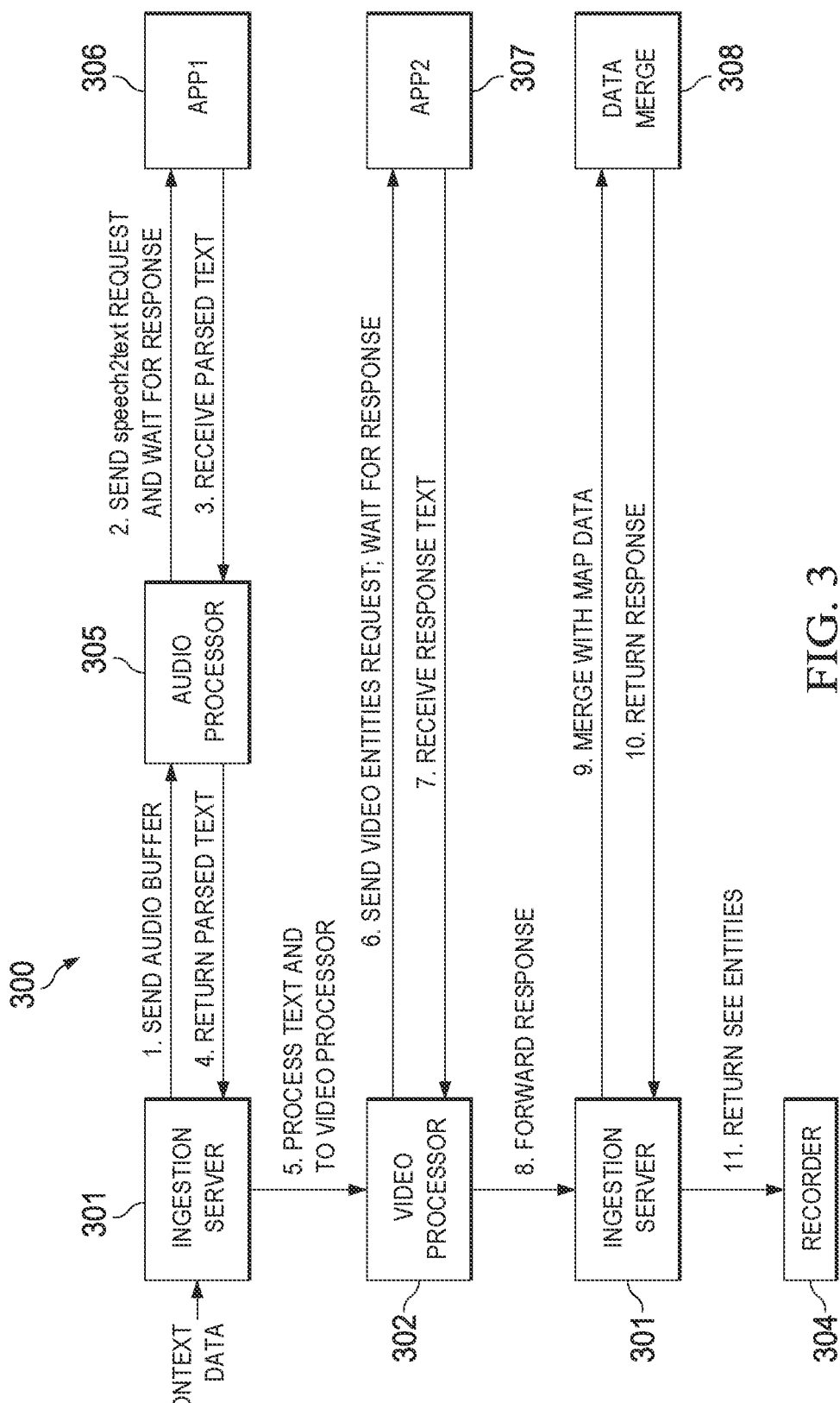
FIG. 3 is a block diagram of a data processing pipeline for processing a context data flow, according to some implementations of this disclosure.

FIG. 3 is a block diagram of a data processing pipeline for processing a context data flow, according to some implementations. In such implementations, data processing pipeline 300 is created and configured to determine what the user is seeing based on the context data captured by a wearable multimedia device worn by the user. Ingestion server 301 receives an audio flow (e.g., including user commentary) from audio buffer 203 of wearable multimedia device and sends the audio flow to audio processor 305. Audio processor 305 sends the audio flow to app 306 which performs speech-to-text conversion and returns parsed text to audio processor 305. Audio processor 305 returns the parsed text to ingestion server 301.

Video processor 302 receives the parsed text from ingestion server 301 and sends a requests to video processing app 307. Video processing app 307 identifies objects in the video scene and uses the parsed text to label the objects. Video processing app 307 sends a response describing the scene (e.g., labeled objects) to video processor 302. Video processor then forwards the response to ingestion server 301. Ingestion server 301 sends the response to data merge process 308, which merges the response with the user's location, orientation, and map data. Data merge process 308 returns a response with a scene description to recorder 304 on the wearable multimedia device. For example, the response can include text describing the scene as the child's birthday party, including a map location and a description of objects in the scene (e.g., identify people in the scene). Recorder 304 associates the scene description with the multimedia data (e.g., using a flowid) stored on the wearable multimedia device. When the user recalls the data, the data is enriched with the scene description.

In some implementations, data merge process 308 may use more than just location and map data. There can also be a notion of ontology. For example, the facial features of the user's Dad captured in an image can be recognized by the cloud computing platform, and be returned as "Dad" rather than the user's name, and an address such as "555 Main Street, San Francisco, Calif." can be returned as "Home." The ontology can be specific to the user and can grow and learn from the user's input.

Example Transportation Application

Figure 4:
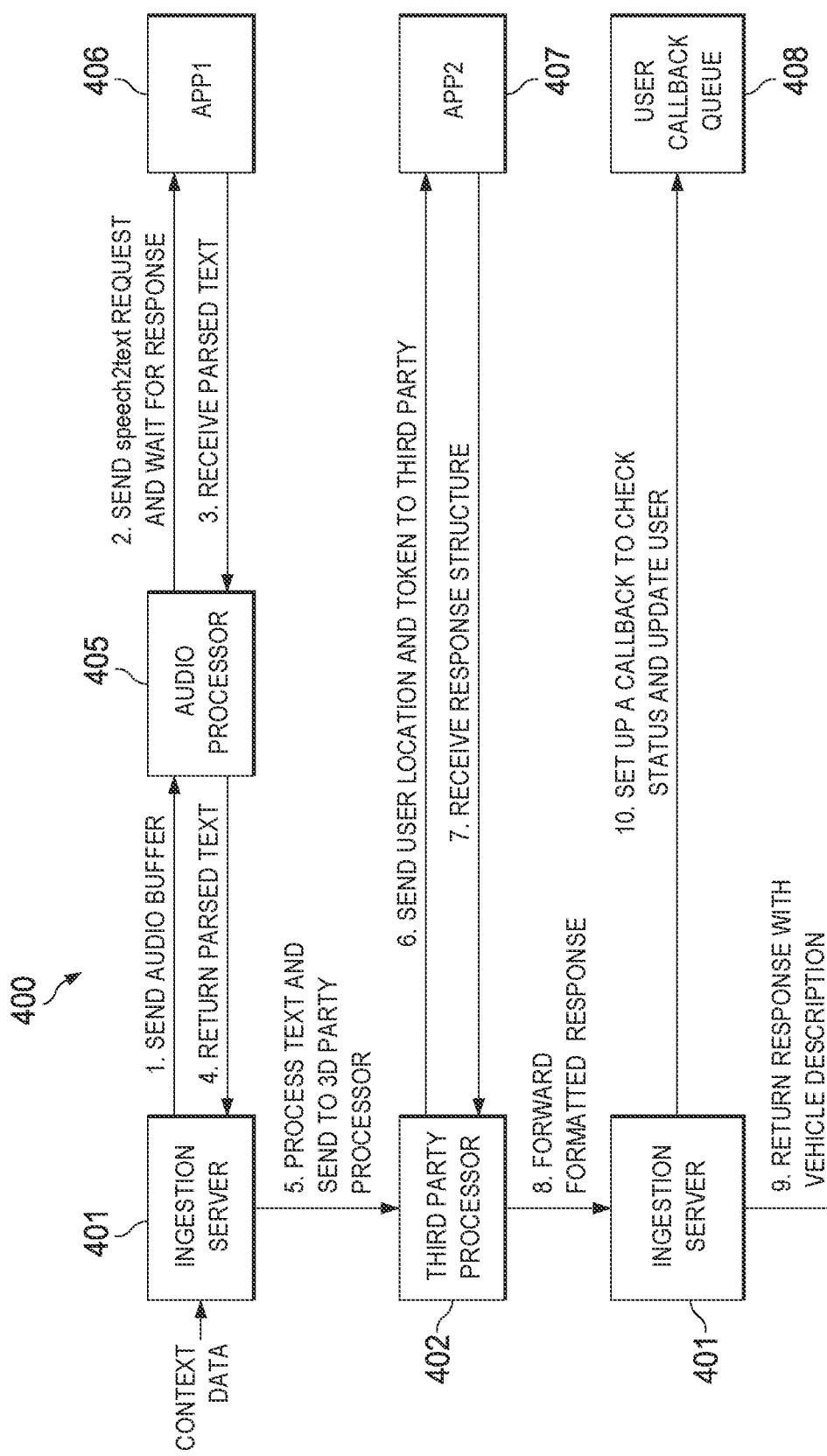
FIG. 4 is a block diagram of another data processing for processing a context data flow for a transportation application, according to some implementations of this disclosure.

FIG. 4 is a block diagram of another data processing for processing a context data flow for a transportation application, according to some implementations. In such implementations, data processing pipeline 400 is created to call a transportation company (e.g., Uber®, Lyft®) to get a ride home. Context data from a wearable multimedia device is received by ingestion server 401 and an audio flow from an audio buffer 203 is sent to audio processor 405. Audio processor 405 sends the audio flow to app 406, which converts the speech to text. The parsed text is returned to audio processor 405, which returns the parsed text to ingestion server 401 (e.g., a user speech request for transportation). The processed text is sent to third party processor 402. Third party processor 402 sends the user location and a token to a third party application 407 (e.g., Uber® or Lyft™®) application). In some implementations, the token is an API and authorization token used to broker a request on behalf of the user. Application 407 returns a response data structure to third party processor 402, which is forwarded to ingestion server 401. Ingestion server 401 checks the ride arrival status (e.g., ETA) in the response data structure and sets up a callback to the user in user callback queue 408. Ingestion server 401 returns a response with a vehicle description to recorder 404, which can be spoken to the user by a digital assistant through a loudspeaker on the wearable multimedia device, or through the user's headphones or earbuds via a wired or wireless connection.

FIG. 5 illustrates data objects used by the data processing system of FIG. 2, according to some implementations. The data objects are part of software component infrastructure instantiated on the cloud computing platform. A "flows" object includes the flowid, deviceid, start, end, lat, lon, attributes and entities. "Flowid" identifies the data flow (e.g., video, audio, photo), "deviceid" identifies the wearable multimedia device (e.g., a mobile device ID), "start" is the start time of the context data flow, "end" is the end time of the context data flow, "lat" is the latitude of the wearable multimedia device, "lon" is the longitude of the wearable multimedia device, "attributes" include, for example, birthday, facial points, skin tone, audio characteristics, address, phone number, etc., and "entities" make up an ontology. For example, the name "John Do" would be mapped to "Dad" or "Brother" depending on the user.

A "Users" object includes the data userid, deviceid, email, fname and lname. Userid identifies the user with a unique identifier, deviceid identifies the wearable device with a unique identifier, email is the user's registered email address, fname is the user's first name and lname is the user's last name. A "Userdevices" object includes the data userid and deviceid. A "devices" object includes the data deviceid, started, state, modified and created. In some implementations, deviceid is a unique identifier for the device (e.g., distinct from a MAC address). Started is when the device was first started. State is on/off/sleep. Modified is the last modified date, which reflects the last state change or operating system (OS) change. Created is the first time the device was turned on.

A "ProcessingResults" object includes the data flowid, ai, result, callback, duration an accuracy. In some implementations, flowid is each user flow as a Universally Unique Identifier (UUID). For example, a data flow that was started from 8:00 AM to 10:00 AM will have id:15h158dhb4 and a data flow that starts from 10:15 AM to 10:18 AM will have a UUID that was contacted for this data flow. AI is the identifier for the platform application that was contacted for this data flow. Result is the data sent from the platform application. Callback is the callback that was used (versions can change hence the callback is tracked in case the platform needs to replay the request). Accuracy is the score for how accurate the result set is. In some implementations, processing results can be used for multiple tasks, such as 1) to inform the merge server of the full set of results, 2) determine the fastest AI so that user experience can be enhanced, and 3) determine the most accurate ai. Depending on the use case, one may favor speed over accuracy or vice versa.

An "Entities" object includes the data entityID, userID, entityName, entityType and entityAttribute. EntityID is a UUID for the entity and an entity having multiple entries where the entityID references the one entity. For example, "Barack Obama" would have an entityID of 144, which could be linked in an associations table to POTUS44 or "Barack Hussein Obama" or "President Obama." UserID identifies the user that the entity record was made for. EntityName is the name that the userID would call the entity. For example, Malia Obama's entityName for entityID 144 could be "Dad" or "Daddy." EntityType is a person, place or thing. EntityAttribute is an array of attributes about the entity that are specific to the userID's understanding of that entity. This maps entities together so that when, for example, Malia makes the speech query: "Can you see Dad?", the cloud computing platform can translate the query to Barack Hussein Obama and use that in brokering requests to third parties or looking up information in the system.

Example Processes

Figure 6:
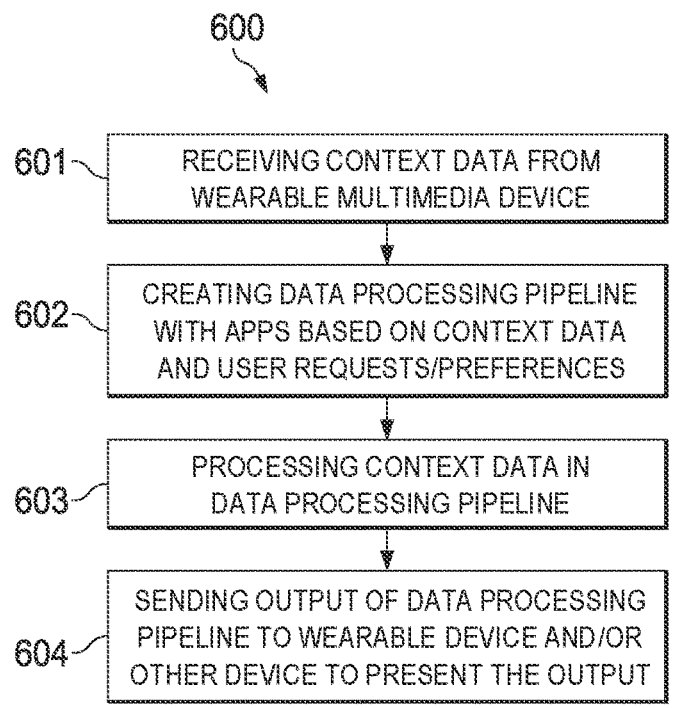
FIG. 6 is flow diagram of a data pipeline process, according to some implementations of this disclosure.

FIG. 6 is flow diagram of a data pipeline process, according to some implementations. Process 600 can be implemented using wearable multimedia devices 101 and cloud computing platform 102 described in reference to FIGS. 1-5.

Process 600 can begin by receiving context data from a wearable multimedia device (601). For example, the context data can include video, audio and still images captured by a camera and audio subsystem of the wearable multimedia device.

Process 600 can continue by creating (e.g., instantiating) a data processing pipeline with applications based on the context data and user requests/preferences (602). For example, based on user requests or preferences, and also based on the data type (e.g., audio, video, photo), one or more applications can be logically connected to form a data processing pipeline to process the context data into a presentation to be playback on the wearable multimedia device or another device.

Process 600 can continue by processing the context data in the data processing pipeline (603). For example, speech from user commentary during a moment or transaction can be converted into text, which is then used to label objects in a video clip.

Process 600 can continue by sending the output of the data processing pipeline to the wearable multimedia device and/or other playback device (604).

Example Cloud Computing Platform Architecture

Figure 7:
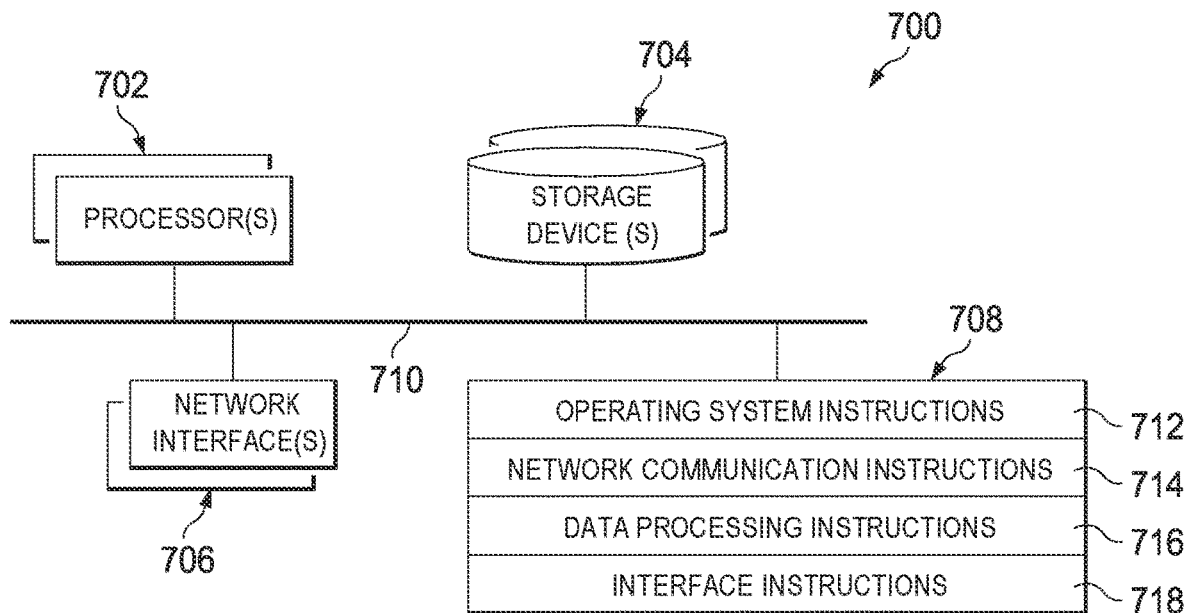
FIG. 7 is an architecture for the cloud computing platform, according to some implementations of this disclosure.

FIG. 7 is an example architecture 700 for cloud computing platform 102 described in reference to FIGS. 1-6, according to some implementations. Other architectures are possible, including architectures with more or fewer components. In some implementations, architecture 700 includes one or more processor(s) 702 (e.g., dual-core Intel® Xeon® Processors), one or more network interface(s) 706, one or more storage device(s) 704 (e.g., hard disk, optical disk, flash memory) and one or more computer-readable medium(s) 708 (e.g., hard disk, optical disk, flash memory, etc.). These components can exchange communications and data over one or more communication channel(s) 710 (e.g., buses), which can utilize various hardware and software for facilitating the transfer of data and control signals between components.

The term "computer-readable medium" refers to any medium that participates in providing instructions to processor(s) 702 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium(s) 708 can further include operating system 712 (e.g., Mac OS® server, Windows® NT server, Linux Server), network communication module 714, interface instructions 716 and data processing instructions 716.

Operating system 712 can be multi-user, multiprocessing, multitasking, multithreading, real time, etc. Operating system 712 performs basic tasks, including but not limited to: recognizing input from and providing output to processors/devices 702, 704, 706 and 708; keeping track and managing files and directories on computer-readable medium(s) 708 (e.g., memory or a storage device); controlling peripheral devices; and managing traffic on the one or more communication channel(s) 710. Network communications module 714 includes various components for establishing and maintaining network connections (e.g., software for implementing communication protocols, such as TCP/IP, HTTP, etc.) and for creating a distributed streaming platform using, for example, Apache Kafka™. Data processing instructions 716 include server-side or backend software for implementing the server-side operations, as described in reference to FIGS. 1-6. Interface instructions 718 includes software for implementing a web server and/or portal for sending and receiving data to and from wearable multimedia devices 101, third party application developers 104 and third party platforms 105, as described in reference to FIG. 1.

Architecture 700 can be included in any computer device, including one or more server computers in a local or distributed network each having one or more processing cores. Architecture 700 can be implemented in a parallel processing or peer-to-peer infrastructure or on a single device with one or more processors. Software can include multiple software components or can be a single body of code.

Example Wearable Multimedia Device Architecture

Figure 8:
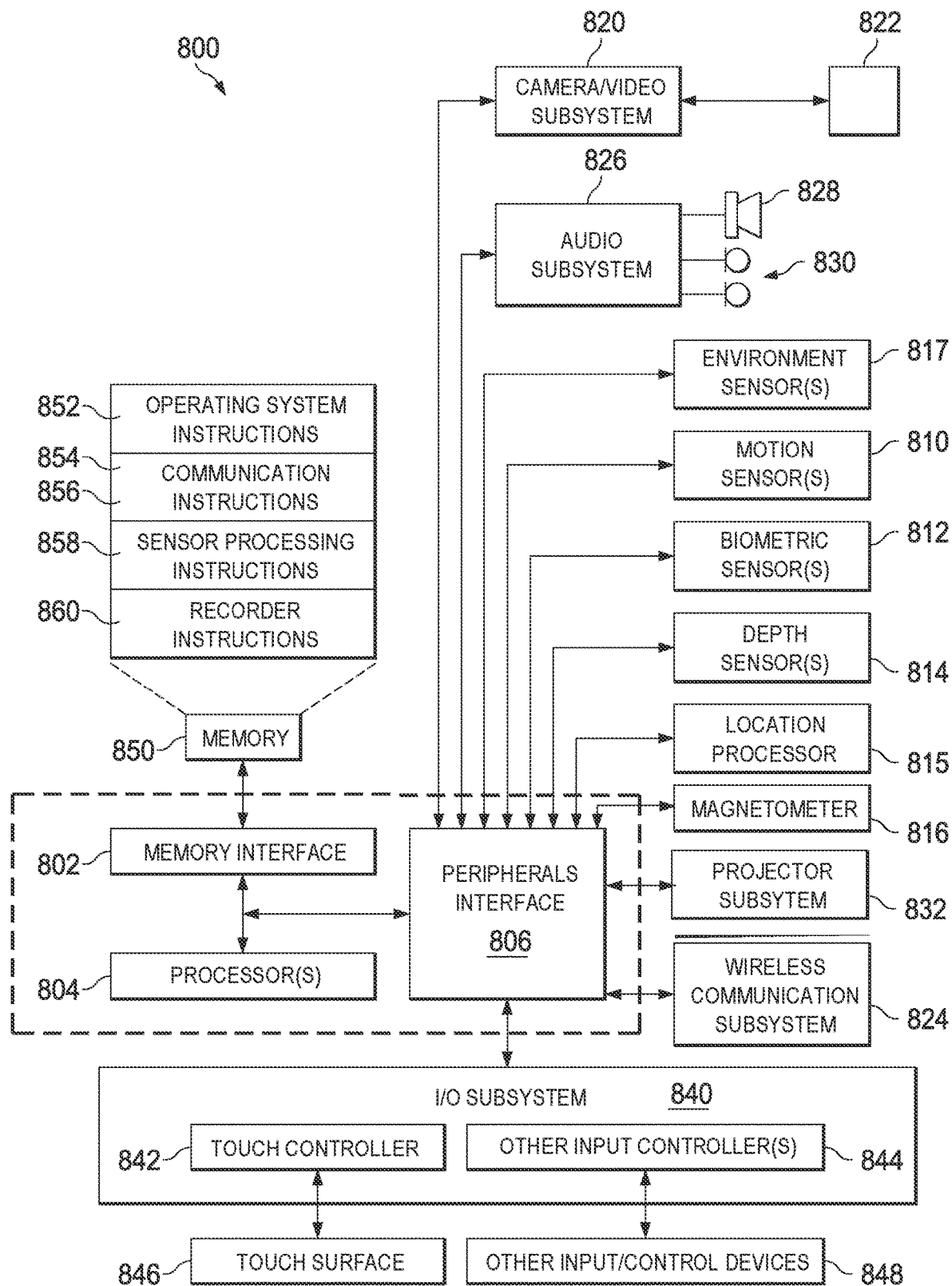
FIG. 8 is an architecture for the wearable multimedia device, according to some implementations of this disclosure.

FIG. 8 is a block diagram of example architecture 800 for a wearable multimedia device implementing the features and processes described in reference to FIGS. 1-6. Architecture 800 may include memory interface 802, data processor(s), image processor(s) or central processing unit(s) 804, and peripherals interface 806. Memory interface 802, processor(s) 804 or peripherals interface 806 may be separate components or may be integrated in one or more integrated circuits. One or more communication buses or signal lines may couple the various components.

Sensors, devices, and subsystems may be coupled to peripherals interface 806 to facilitate multiple functions. For example, motion sensor(s) 810, biometric sensor(s) 812, and depth sensor(s) 814 may be coupled to peripherals interface 806 to facilitate motion, orientation, biometric, and depth detection functions. In some implementations, motion sensor(s) 810 (e.g., an accelerometer, rate gyroscope) may be utilized to detect movement and orientation of the wearable multimedia device.

Other sensors may also be connected to peripherals interface 806, such as environmental sensor(s) (e.g., temperature sensor, barometer, ambient light) to facilitate environment sensing functions. For example, a biometric sensor can detect fingerprints, face recognition, heart rate and other fitness parameters. In some implementations, a haptic motor (not shown) can be coupled to the peripheral interface, which can provide vibration patterns as haptic feedback to the user.

Location processor 815 (e.g., GNSS receiver chip) may be connected to peripherals interface 806 to provide georeferencing. Electronic magnetometer 816 (e.g., an integrated circuit chip) may also be connected to peripherals interface 806 to provide data that may be used to determine the direction of magnetic North. Thus, electronic magnetometer 816 may be used by an electronic compass application.

Camera subsystem 820 and an optical sensor 822, e.g., a charged coupled device (CCD) or a complementary metal-oxide semiconductor (CMOS) optical sensor, may be utilized to facilitate camera functions, such as recording photographs and video clips. In some implementations, the camera has a 180° FOV and OIS. The depth sensor can include an infrared emitter that projects dots in a known pattern onto an object/subject. The dots are then photographed by a dedicated infrared camera and analyzed to determine depth data. In some implementations, a time-of-flight (TOF) camera can be used resolve distance based on the known speed of light and measuring the time-of-flight of a light signal between the camera and an object/subject for each point of the image.

Communication functions may be facilitated through one or more communication subsystems 824. Communication subsystem(s) 824 may include one or more wireless communication subsystems. Wireless communication subsystems 824 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data (e.g., a projector).

The specific design and implementation of the communication subsystem 824 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, WiMax, ZigBee™), 3G, 4G, 4G LTE, code division multiple access (CDMA) networks, near field communication (NFC), Wi-Fi Direct and a Bluetooth™ network. Wireless communication subsystems 824 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 826 may be coupled to a speaker 828 and one or more microphones 830 to facilitate voice-enabled functions, such as voice recognition, voice replication, digital recording, telephony functions and beamforming.

I/O subsystem 840 may include touch controller 842 and/or another input controller(s) 844. Touch controller 842 may be coupled to a touch surface 846. Touch surface 846 and touch controller 842 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 846. In one implementation, touch surface 846 may display virtual or soft buttons, which may be used as an input/output device by the user.

Other input controller(s) 844 may be coupled to other input/control devices 848, such as one or more buttons, rocker switches, thumb-wheel, infrared port, USB port, and/or a pointer device such as a stylus. The one or more buttons (not shown) may include an up/down button for volume control of speaker 828 and/or microphone 830.

Further, a projector subsystem 832 may be connected to peripherals interface 806 to present information visually to a user in the form of projected light. For example, the projector subsystem 832 can project light onto a surface according to a particular spatial and/or temporal pattern, such that the user perceives text, images, videos, colors, patterns, and/or any other graphical information on the surface. In some implementations, the projector subsystem 832 can project light onto a surface of the user's body, such as the user's hand or palm. In some implementations, the projector subsystem 832 can project light onto a surface other than the user's body, such as a wall, a table, a desk, or any other object. The projector subsystem 832 is described in greater detail with reference to FIG. 9.

In some implementations, the projector subsystem 832 project light onto a surface to provide an interactive VI for a user. For example, the projector subsystem 832 can project light onto the surface, such that the user perceives one or more interactive user interface elements (e.g., selectable buttons, dials, switches, boxes, images, videos, text, icons, etc.). Further, the user can interact with the VI by performing one or more gestures with respect to the VI and the user interface elements. For example, the user can perform a pointing gesture, a tapping gesture, a swiping gesture, a waving gesture, or any other gesture using her hands and/or fingers. The wearable multimedia device can detect the performed gestures using one or more sensors (e.g., the camera/video subsystems 820, environment sensor(s) 817, depth sensor(s) 814, etc.), identify one or more commands associated with those gestures, and execute the identified commands (e.g., using the processor(s) 804). Example VIs are described in further detail below.

In some implementations, a device including architecture 800 plays back to a user recorded audio and/or video files (including spatial audio), such as MP3, AAC, spatial audio and MPEG video files. In some implementations, the device including architecture 800 may include the functionality of an MP3 player and may include a pin connector or other port for tethering to other devices. Other input/output and control devices may be used. In some implementations, the device including architecture 800 may include an audio processing unit for streaming audio to an accessory device over a direct or indirect communication link.

Memory interface 802 may be coupled to memory 850. Memory 850 may include high-speed random access memory or non-volatile memory, such as one or more magnetic disk storage devices, one or more optical storage devices, or flash memory (e.g., NAND, NOR). Memory 850 may store operating system 852, such as Darwin, RTXC, LINUX, UNIX, OS X, iOS, WINDOWS, or an embedded operating system such as VxWorks. Operating system 852 may include instructions for handling basic system services and for performing hardware dependent tasks. In some implementations, operating system 852 may include a kernel (e.g., UNIX kernel).

Memory 850 may also store communication instructions 854 to facilitate communicating with one or more additional devices, one or more computers or servers, including peer-to-peer communications with wireless accessory devices, as described in reference to FIGS. 1-6. Communication instructions 854 may also be used to select an operational mode or communication medium for use by the device, based on a geographic location of the device.

Memory 850 may include sensor processing instructions 858 to facilitate sensor-related processing and functions and recorder instructions 860 to facilitate recording functions, as described in reference to FIGS. 1-6. Other instructions can include GNSS/Navigation instructions to facilitate GNSS and navigation-related processes, camera instructions to facilitate camera-related processes and user interface instructions to facilitate user interface processing, including a touch model for interpreting touch inputs.

Each of the above identified instructions and applications may correspond to a set of instructions for performing one or more functions described above. These instructions need not be implemented as separate software programs, procedures, or modules. Memory 850 may include additional instructions or fewer instructions. Furthermore, various functions of the device may be implemented in hardware and/or in software, including in one or more signal processing and/or application specific integrated circuits (ASICs).

Figure 9:
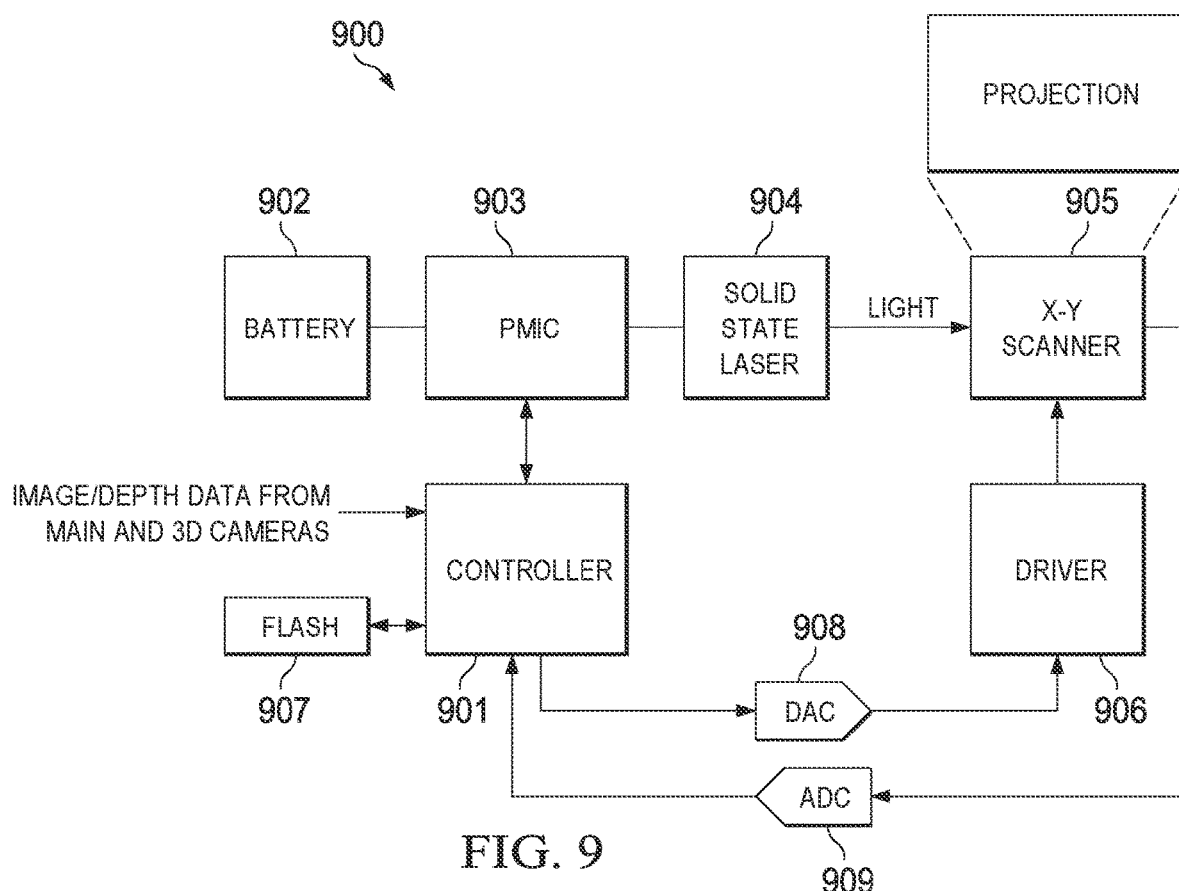
FIG. 9 is a system block diagram of a projector architecture, according to some implementations of this disclosure.

FIG. 9 is a system block diagram of the projector subsystem 832, according to some implementations. The projector subsystem 832 scans a pixel in two dimensions, images a 2D array of pixels, or mixes imaging and scanning. Scanning projectors directly utilize the narrow divergence of laser beams, and two-dimensional (2D) scanning to "paint" an image pixel by pixel. In some implementations, separate scanners are used for the horizontal and vertical scanning directions. In other implementations, a single biaxial scanner is used. The specific beam trajectory also varies depending on the type of scanner used.

In the example shown, the projector subsystem 832 is a scanning pico-projector that includes controller 901, battery 902, power management chip (PMIC) 903, solid state laser 904, X-Y scanner 905, driver 906, memory 907, digital-to-analog converter (DAC) 908 and analog-to-digital converter (ADC) 909.

Controller 901 provides control signals to X-Y scanner 905. X-Y scanner 905 uses moveable mirrors to steer the laser beam generated by solid state laser 904 in two dimensions in response to the control signals. X-Y scanner 905 includes one or more micro-electromechanical (MEMS) micromirrors that have controllable tilt angles in one or two dimensions. Driver 906 includes a power amplifier and other electronic circuitry (e.g., filters, switches) to provide the control signals (e.g., voltages or currents) to X-Y scanner 905. Memory 907 stores various data used by the projector including laser patterns for text and images to be projected. DAC 908 and ADC 909 provide data conversion between digital and analog domains. PMIC 903 manages the power and duty cycle of solid state laser 904, including turning on and shutting of solid state laser 904 and adjusting the amount of power supplied to solid state laser 904. Solid state laser 904 can be, for example, a vertical-cavity surface-emitting laser (VCSEL).

In some implementations, controller 901 uses image data from the camera/video subsystem 820 and/or depth data from the depth sensor(s) 814 to recognize and track user hand and/or finger positions on the laser projection, such that user input is received by the wearable multimedia device 101 using the laser projection as an input interface.

In other implementations, instead or additionally, the projector subsystem 832 uses a vector-graphic projection display and low-powered fixed MEMS micromirrors to conserve power. Because the projector subsystem 832 includes a depth sensor, the projected area can be masked when needed to prevent projecting on a finger/hand interacting with the laser projected image. In some implementations, the depth sensor can also track gestures to control the input on another devices (e.g., swiping through images on a TV screen, interacting with computers, smart speakers, etc.).

In some implementations, Liquid Crystal on Silicon (LCoS or LCOS), Digital Light Processing (DLP) or Liquid Chrystal Display (LCD) digital projection technology can be used instead of a pico-projector.

Example Virtual Interfaces

As described above, a wearable multimedia device 101 can include a projector subsystem 832 configured to present information visually to a user in the form of projected light. For example, the projector subsystem 832 can project light onto a surface (e.g., a surface of a user's hand, such as the user's palm) according to a particular spatial and/or temporal pattern, such that the user perceives a VI with one or more user interface elements. In some implementations, a VI and/or the user interface elements can include any combination of text, images, videos, colors, patterns, shapes, lines, or any other graphical information.

Further, the user can perform gestures to interact with the VI. For instance, the user can perform one or more gestures directed at one or more of the user interface elements. As examples, the user can point to a user interface element, touch or tap a user interface element using her finger (e.g., a single time, or multiple times in a sequence), perform a swiping motion along a user interface element using her finger, wave at a user interface element using her hand, hover over the user interface element, or perform any other hand or finger gesture. The wearable multimedia device 101 can detect the performed gestures using one or more sensors (e.g., the camera/video subsystems 820, environment sensor(s) 817, depth sensor(s) 814, etc.), identify one or more commands associated with those gestures, and execute the identified commands (e.g., using the processor(s) 804).

At least some of the user interface elements and/or commands can be used to control the operation of the wearable multimedia device 101. For example, at least some of the user interface elements and/or commands can be used to execute or control the generation of video and/or audio content, the viewing of content, the editing of content, the storing and transmission data, and/or any other operation described herein. In some implementations, a wearable multimedia device 101 can present a VI that allows a user to compose and send a message to one or more other users. This VI may also be referred to as a message composition interface.

Figure 10:
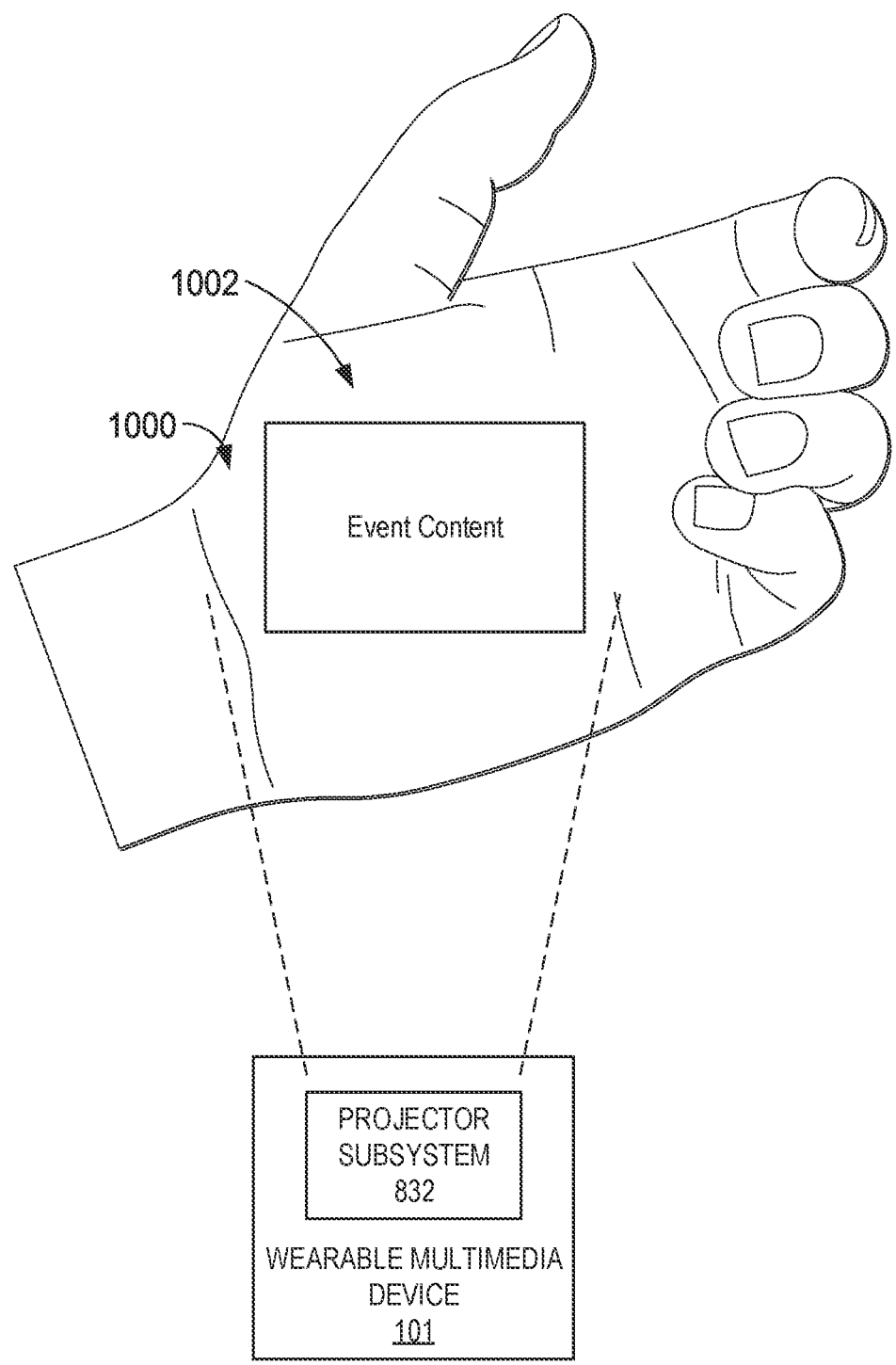
FIG. 10 is a diagram of an example of a virtual interface, according to some implementations of this disclosure.

As an illustrative example, FIG. 10 shows an event viewing interface 1002 projected by a projector subsystem 832 onto a user's palm 1000. The event viewing interface 1002 presents content of one or more events, such as events that are determined to be relevant to the user or events included in event streams that the user selects to view.

Figure 11:
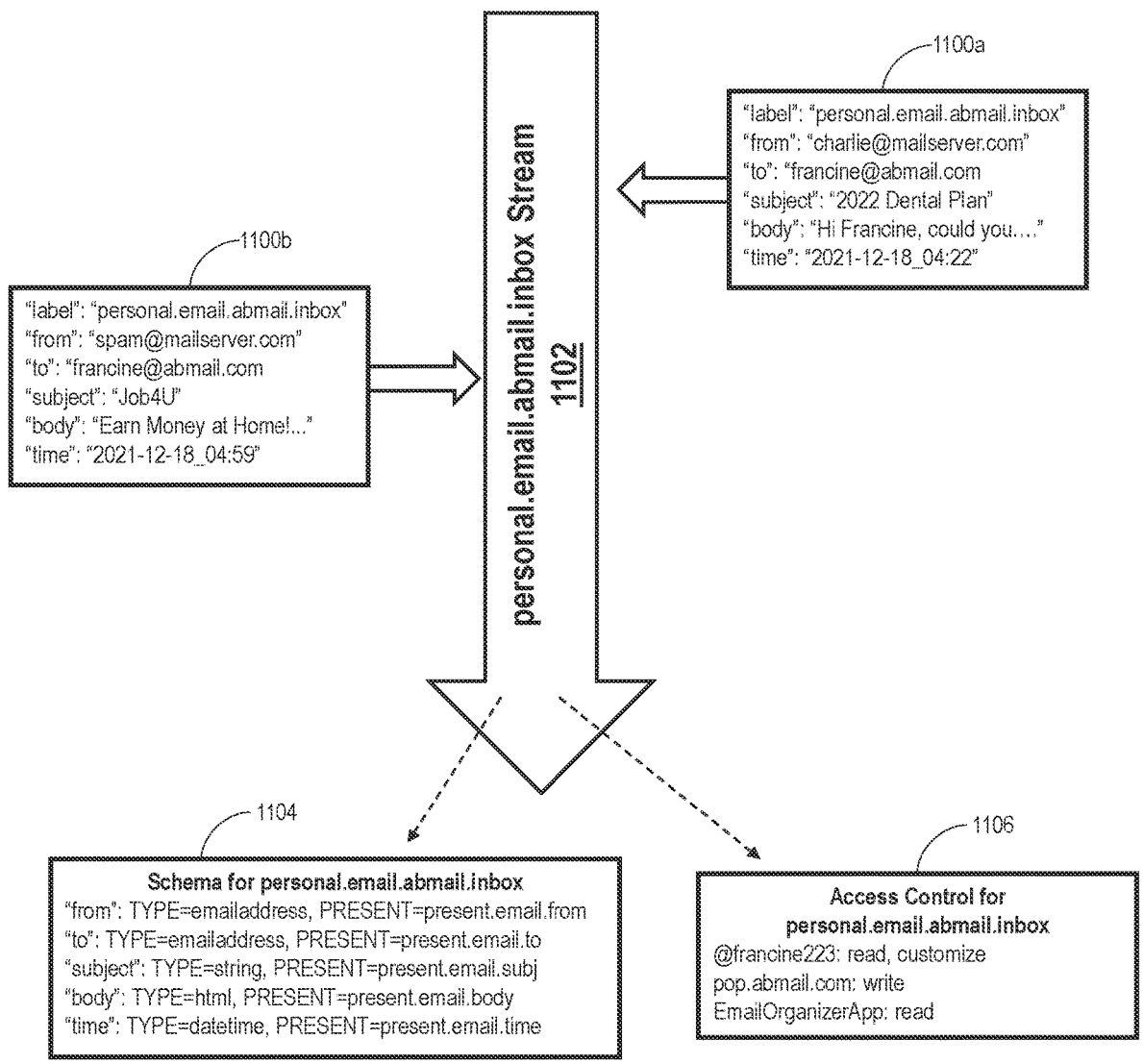
FIG. 11 is a diagram of an example of an event stream, according to some implementations of this disclosure.

In order to provide relevant, useful content in the event viewing interface 1000, event data structures (which, as noted above, can be referred to as "events") can have formats that allow for categorization and grouping of events into event streams. An example event stream 1102 is shown in FIG. 11. Event stream 1102 is associated with a label "personal.email.abmail.inbox" and, as such, is limited to events that include the label "personal.email.abmail.inbox."

As shown in FIG. 11, events 1100a and 1100b include the label "personal.email.abmail.inbox" and so are included in the event stream 1102. In the label "personal.email.abmail.inbox," each element of the label (referred to as a "category") indicates an object type associated with the event. Category "personal" indicates that the event is associated with a specific user, e.g., the user of the wearable multimedia device, as a "personal" object type. The category "email"

indicates that the event is an email event (an "email" object type). The category "abmail" indicates that the email event is associated with email service "abmail" (an "abmail" object type). The category "inbox" indicates that the email event is an inbox event (an "inbox" object type), such as receiving a new email, and not another type of email event such as a reminder of an unfinished email draft.

In some implementations, the categories are "nested" with one another such that each category of the label (except for one broadest category) represents a sub-category of another category of the label. For example, in the label "personal.email.abmail.inbox," "email" events are a type of a "personal" event, "abmail" events are a type of "email" event, and "inbox" events are a type of "abmail" event. Accordingly, the label represents a hierarchy of categories. In other implementations, labels do not include nested categories but, rather, include a set of categories that each indicate an object type without necessarily being linked to one another in a hierarchical manner. In some implementations, the labels can be referred to as "taxonomic," because the labels representing categorizations of events into taxa at different hierarchical taxonomic ranks.

In some implementations, labels conform to a common format. For example, in the example of FIG. 11, the labels of events 1100*a* and 1100*b* conform to a dot-delimited format in which each category in the label represents a sub-category of the previous category, the categories separated by dot characters. Other common formats are also within the scope of this disclosure. The common format of labels allows for events to be aggregated, compared, and searched, even when the labels originate from different sources, include at least partially different sets of categories, and/or include different numbers of categories.

The events 1100*a* and 1100*b* also include content, such as, in this example, data indicating a sender and recipient of each email, and email subject line, an email body, and a time of email transmission. Content of events, in various implementations, can include text, images, video, interactive features (e.g., icons, swipeable elements, and editing tools), audio (e.g., to be output using audio subsystem 826), polls, animations, links to other content (e.g., links to other events), references to storage locations of these and other types of content (e.g., a server storage location of an image) and other types of content presentable by a wearable multimedia device.

Events can be implemented as any appropriate data structure, such as JavaScript Object Notation (JSON) structures, Extensible Markup Language (XML) structures, or comma-separated values (CSV) structures.

In some implementations, event streams are associated with schema data that define a data structure for events of the event stream (e.g., events having a label associated with the event stream). For example, as shown in FIG. 11, schema data 1104 defines attributes included in events having the label "personal.email.abmail.inbox," data types of the attributes, and an indication (in this example, called a PRESENT value) of how the attribute should be presented in a VI. For example, the "from" attribute has TYPE "emailaddress" and PRESENT value "present.email.from." When a wearable multimedia device determines to present an event having the label "personal.email.abmail.inbox," a processing system of the wearable multimedia device (e.g., processors 804) determines how to present content in the event based on PRESENT values in the schema data 1104 corresponding to the label/corresponding to the event stream. The PRESENT values can be associated with display location of the content in a VI, content display size (e.g., image size, font size, or video size), content styling (e.g., font style or an animation with which the content should be presented), and other attributes.

Figure 12:
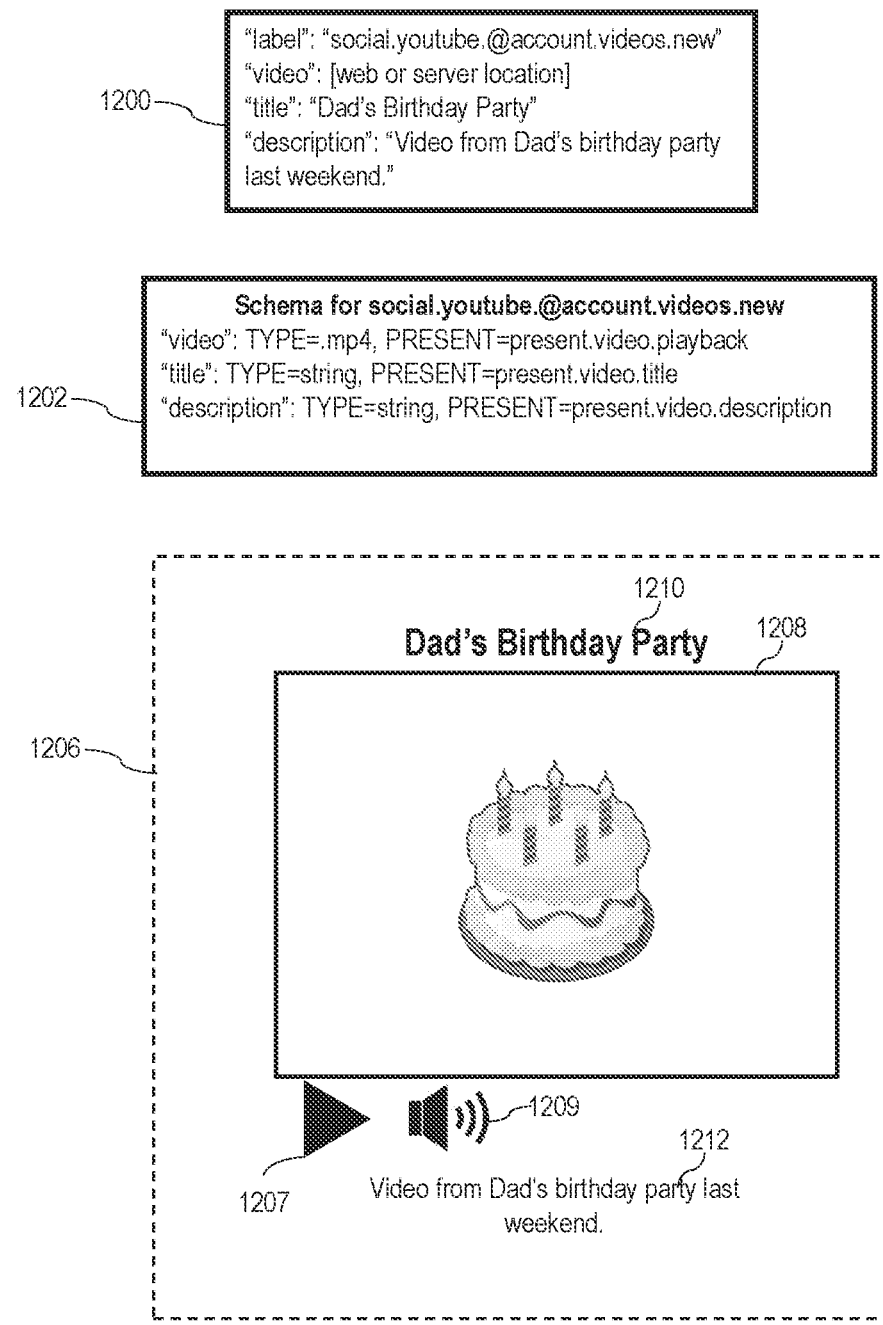
FIG. 12 is a diagram of an example of data schema and content presentation, according to some implementations of this disclosure.

For example, as shown in FIG. 12, an event 1200 includes a label "social.youtube.@account.videos.new" and three content elements: a video (referenced by a storage location of the video file in an internet or other server, such as in databases 106 or third party platform 105), a video title, and a video description. The category "@account" indicates an account associated with a particular user, e.g., a user of a wearable multimedia device. As shown in schema data 1202 associated with an event stream "social.youtube.@account.videos.new," TYPEs corresponding to attributes indicate that the video is interpreted as a .mp4 file and that the video title and video description are strings. A PRESENT value associated with the video attribute indicates that the .mp4 should be displayed in a VI 1206 as a video playback element 1208, e.g., with a particular size, in association with a playback control element 1207 and a volume control element 1209, and other video attributes associated with the value "present.video.playback." A PRESENT value associated with the title attribute indicates that the video title should be displayed in the VI 1206 as a title 1210 located above the video playback element 1208 with a certain text styling (e.g., a font size of 16 and bolded). A PRESENT value associated with the description attribute indicates that the video description should be displayed in the VI 1206 as a description 1212 located below the video playback element 1208 with a certain text styling (e.g., a font size of 12 and in plain text). As noted above, the VI 1206 can be presented in various ways, such as displayed on a screen display or projected onto a desk surface or onto a hand of a user.

The specification of TYPEs and, in some implementations, PRESENT values in schema data for data streams provides reliable content presentation. Because events are controlled to have content matching the specified TYPEs when adding the events to event streams (e.g., as described below in reference to FIGS. 21-22), content data presentation errors can be avoided/reduced. And the PRESENT values provide category/stream-specific instructions for content presentation, such that different event types can be presented in different manners that are more appropriate to the event types.

In some implementations, event streams are associated with access control data (sometimes referred to as permissions data) that define which entities can interact with events included in the event streams and in which ways the entities can interact with the events. The entities can include specific users, Referring back to FIG. 11, event stream 1102 is associated with access control data 1106. The access control data 1106 indicates that a user francine 223 can read (e.g., be presented with) events in the event stream 1102 and customize the event stream 1102. Customization can include user interactions that adjust parameters of the event stream 1102, such as selecting an upvote interface element to "like" an event and/or indicate the event's relevance to the user, selecting a downvote interface element to "dislike" an event and/or indicate the event's irrelevance to the user, selecting a "hide" or "delete" interface element to remove the event from the event stream 1102, or other interaction types. The access control data 1106 further indicates that a web server pop.abmail.com has write access to the event stream 1102. For example, the web server pop.abmail.com can provide events with the label "personal.email.abmail.inbox" to the cloud computing platform 102 so that the events are added to the event stream 1102. The access control data 1106 further indicates that an application EmailOrganizerApp, such as an application of a third party platform 105, has read access to the event stream 1102. For example, a server associated with the application EmailOrganizerApp can transmit a query to the cloud computing platform 102 requesting to obtain events of the event stream 1102.

Schema data and/or access control data can be "associated with" event streams in various ways in different implementations. In some implementations, an event stream object is stored, e.g., stored on a wearable multimedia device 101 and/or in a database 106 linked to a cloud computing platform 102. The event stream object can directly include the schema data of the event stream and/or the access control data of the event stream. In some implementations, an event stream object includes pointers to the schema data and/or the access control data of the event stream (e.g., locations at which the schema data and/or the access control data are stored on the wearable multimedia device 101 and/or in the database 106), e.g., without directly including the schema data and/or the access control data.

Methods of associating events with event streams can also vary. In some implementations, an event stream object includes events of the event stream, such as the events 1100a and 1100b shown in FIG. 11. When an event is added to the event stream, the event stream object is updated to include the event, e.g., including content of the event, stored in the event stream object. In some implementations, the event stream object includes pointers to the events (e.g., locations at which the events are stored on the wearable multimedia device 101 and/or in the database 106), e.g., without directly including the events themselves. When an event is added to the event stream, the event stream object is updated to include a pointer to the event, such as a storage location of the event; the event (e.g., the JSON data of the event) need not be included in the event stream object itself. In some implementations, because a given event can be included in multiple event streams (e.g., at different hierarchical levels), the storage space used by events can be reduced by storing the event separately from event stream objects (e.g., storing the event on the wearable multimedia device 101 and/or in the database 106), and having the event stream object include pointers to the storage location(s) of the event. Event stream objects can be stored on wearable multimedia devices 101, in databases 106 coupled to cloud computing platforms 102, or in both.

In some implementations, at least some event streams are not embodied in event stream objects. Rather, event streams can be dynamically obtained and/or constructed by event stream processes running on wearable multimedia devices 101 and/or on cloud computing platforms 102. For example, an event stream process can receive a command "stream.obtain.("personal.email")" and, in response, obtain (e.g., by querying databases 106, third-party platforms 105, and/or systems of wearable multimedia devices 101) all events having a label including "personal.email." The event stream process can further obtain appropriate schema data and/or access control data corresponding to the obtained events. The obtained events can then be provided as an event stream.

Event streams can be presented to users, such as in a collated "feed" manner. For example, a wearable multimedia device 101 or the cloud computing platform can determines that a user follows a given event stream and, in response, present events of the event stream to the user as a collated feed. A user can select to follow an event stream by selecting appropriate elements of a user interface or by providing another type of appropriate command. In some implementations, a user is automatically caused to follow an event stream, e.g., based on a determination that the event stream has high relevance to the user.

Figure 13:
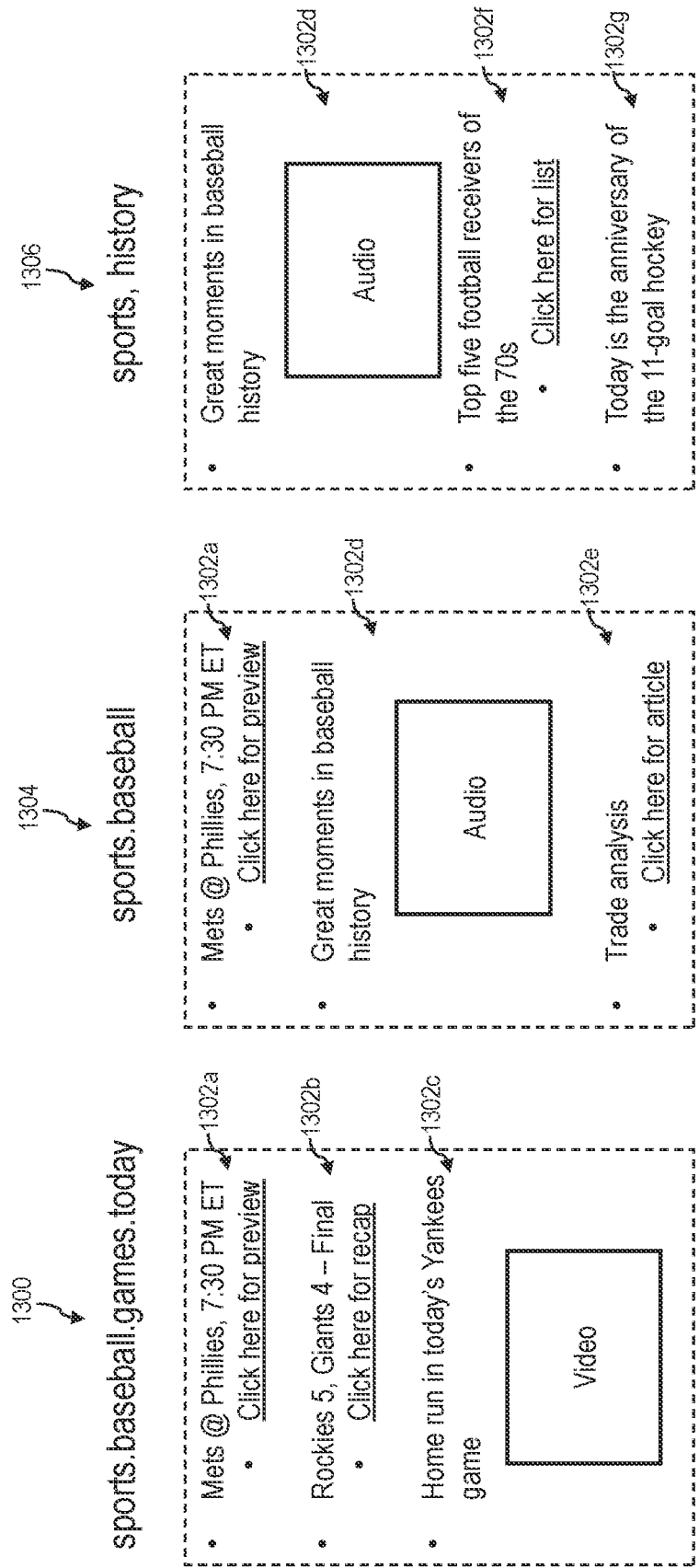
FIGS. 13A-13C are diagrams of examples of event feeds, according to some implementations of this disclosure.

The presentation of event streams can take advantage of the categorization of events by object types, as indicated by the labels of the events, in both hierarchical and non-hierarchical ways. FIGS. 13A-13C show examples of event feeds that can be presented by wearable multimedia devices, such as in VIs. As shown in FIG. 13A, an event feed 1300 includes content corresponding to an event stream of events having a label including "sports.baseball.games.today." For example, content 1302a is included in an event having label "sports.baseball.games.today.preview," content 1302b is included in an event having label "sports.baseball.games.today.recaps," and content 1302c is included in an event having label "sports.baseball.games.today.video." Each of these labels includes a category that is a sub-category of the set of categories "sports.baseball.games.today," such that the event stream associated with the label "sports.baseball.games.today" includes the three events. The event stream associated with "sports.baseball.games.today" can be associated with schema data and access control data as described for event stream 1102.

As shown in FIG. 13B, an event feed 1304 includes content corresponding to an event stream of events having a label including "sports.baseball." This label represents a hierarchy of categories that includes "sports.baseball.games.today," and, accordingly, content 1302a is included in the event feed 1304. Content 1302d is included in an event having label "sports.baseball.history.audio," and content 1302e is included in an event having label "sports.baseball.news.analysis." The event stream associated with "sports.baseball" can be associated with schema data and/or access control data, which may be based on schema data and access control data of sub-streams of the event stream. For example, the event streams associated with "sports.baseball.history.audio" and "sports.baseball.news.analysis" are sub-streams of the event stream associated with "sports.baseball," and, accordingly, schema data of the event stream associated with "sports.baseball" can include attributes included in the schema data of the sub-streams, and/or access control data of the event stream associated with "sports.baseball" can be based on access control data of the sub-streams. Access control data of event streams that have sub-streams or that otherwise represent events from multiple event streams can include category-by-category and/or sub-stream-by-sub-stream data control elements. For example, access control data for the event stream associated with "sports.baseball" can include data indicating that only readers subscribing to a sports website SportsNews have read access to events labeled with "sports.baseball.sportsnews" (e.g., so that only subscribers have content of events labeled with "sports.baseball.sportsnews" in their feeds for the event stream "sports.baseball."

In some implementations, event streams need not be associated with a strict hierarchy of categories. As shown in FIG. 13C, event feed 1306 includes content of events having labels that include the category "sports" and that include the category "history," without requiring any single hierarchy of categories. For example, content 1302d is included in an event having label "sports.baseball.history.audio," content 1302f is included in an event having label "sports.football.history.lists," and content 1302g is included in an event having label "sports.hockey.history.thisdayinhistory." Event feed 1306 corresponds to an event stream that includes events whose labels include both categories "sports" and "history."

Using labels including categories, events from different sources can be browsed, queried, and analyzed together. Some computer operating systems include facilities to report information from peripheral devices, input hardware, onboard sensors, and remote data sources (e.g., databases). This information is typically represented by separate event streams that cannot easily be analyzed jointly. By contrast, using labels sharing a common format, shared categories (e.g., hierarchically-organized categories) can be used to unify events from disparate sources into common event streams. For example, a "system" event stream can include events from the camera/video subsystem 820, the environment sensors 817, the motions sensors 810, the biometric sensors 812, the depth sensors 814, the location processor 815, the magnetometer 816, the battery 902, and/or other device systems. These common event streams can then be provided to developers for unified data analysis and provision.

Figure 14:
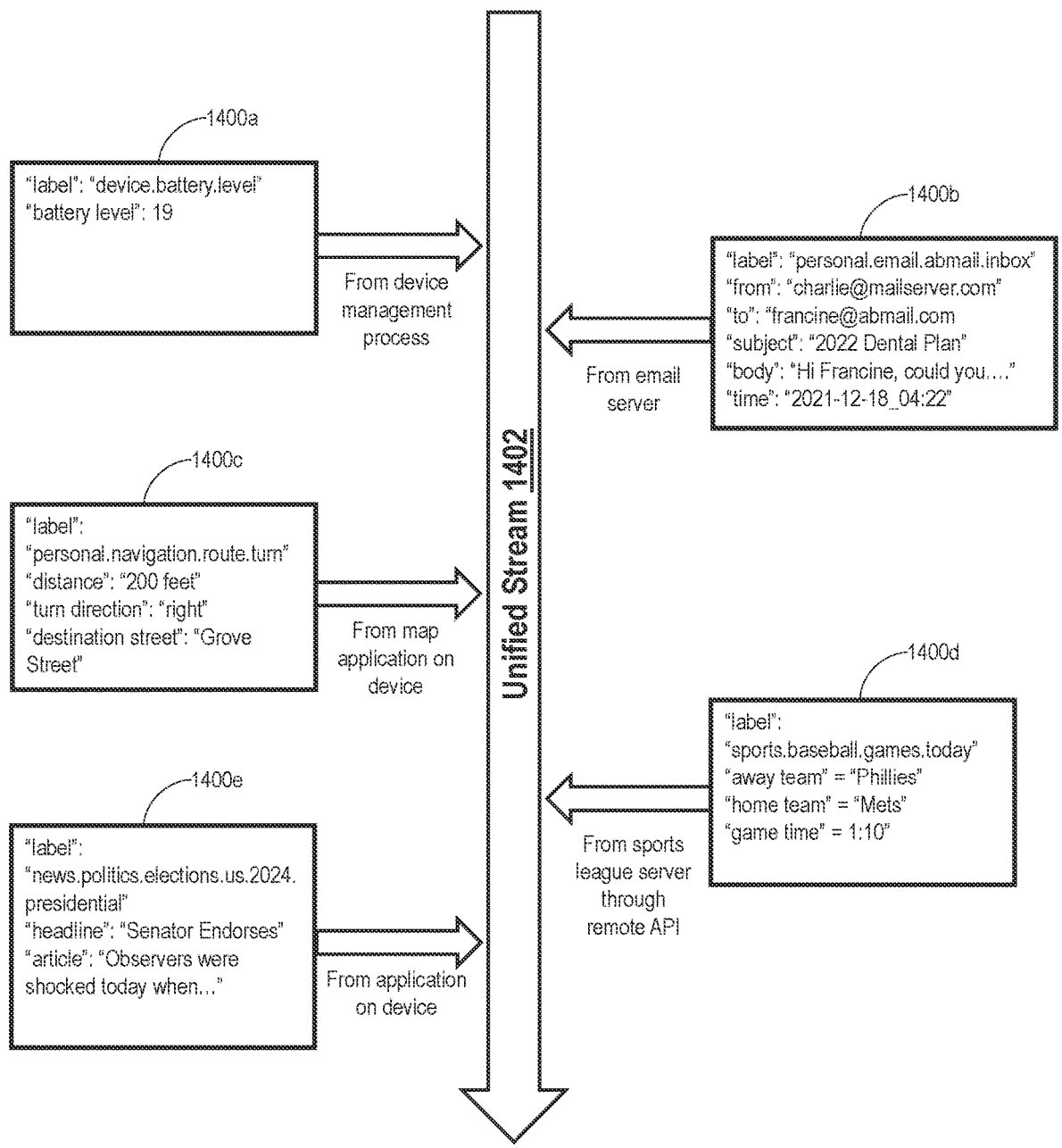
FIG. 14 is a diagram of an example of a unified event stream, according to some implementations of this disclosure.

Some implementations of this disclosure include a unified event stream 1402, as shown in FIG. 14. The unified event stream 1402 can include an entire space of event data available to a user. For example, event 1400a has a "battery level" object type categorized in a "device" category; event 1400b is "email inbox event" object type categorized in a "personal" category; event 1400c is a "turn event" object type for a GPS navigation progress included in the "personal" category; event 1400d is a "today's games" object type included in the "personal" category; and event 1400e is a "presidential news" object type included in a "news" category. Each category in each of the labels shown in FIG. 14 corresponds to an object type, and the categories in each label are formatted in a hierarchical manner indicating sub-categories and super-categories. The events, besides being included in the unified event stream 1402, can also be included in other event streams, e.g., more specific event streams that are sub-streams of the unified event stream 1402, event streams representing narrower categories hierarchies than the universally-included categories included in the unified event stream 1402, and/or event streams that include combinations of categories that may or may not be nested inside one another in a strict hierarchical manner.

Events in the unified event stream 1402 and in other event streams according to this disclosure can be provided by various sources. For example, some events can be provided by a process and/or application running on a wearable multimedia device. As shown in FIG. 14, event 1400a is provided from a device management process of a wearable multimedia device such as a wearable multimedia device. For example, in some implementations, the PMIC 903 measures a charge level of the battery 902, generates the event 1400a, and provides the event 1400a to a process of the wearable multimedia device, such as an operating system process running based on operating system instructions 712 or an event management process running on the wearable multimedia device. Alternatively, or in addition, in some implementations the PMIC 903 provides data indicative of the charge level to the operating system process or another process, which generates the event 1400a based on the data indicative of the charge level.

As another example, event 1400c is provided by a map application running on the wearable multimedia device. For example, the map application determines that a right turn is to be made in 200 feet and, in response, calls an API on the wearable multimedia device to provide the event 1400c or data representative of the event 1400c. As another example, a news application running on the wearable multimedia device receives data of a news article and, in response, generates event 1400e and provides the event 1400e to Further details on APIs for use in event generation are provided in reference to FIGS. 21-22.

In some implementations, events originating at the wearable multimedia device, such as system-type events or events created by applications running on the wearable multimedia device, are transmitted by the wearable multimedia device (e.g., using network interface 706) to a remote computing system, such as cloud computing platform 102, for further processing. The cloud computing platform 102 can be configured to perform operations such as selecting event(s) for presentation to users (e.g., as described in reference to FIG. 15.

Some events can be provided by a third-party platform 105. The event can be transmitted from the third-party platform 105 to a wearable multimedia device 101 and/or to a cloud computing platform 102. For example, event 1400b, and/or data associated therewith can transmitted from an email server included in a third party platform 105 and can be received at a wearable multimedia device 101. Event 1400d and/or data associated therewith is transmitted from a sports league server included in a third party platform 105 and is received at the cloud computing platform 102. The sports league server provides the event 1400d using an API provided by the cloud computing platform 102, as described in further detail with respect to FIGS. 21-22. The cloud computing platform 102 subsequently can transmit the event 1400d or content thereof to the wearable multimedia device 101 for presentation to a user.

Event streams, such as event streams corresponding to event feeds 1300, 1302, and 1306, event stream 1102, and unified event stream 1402, can be queried and analyzed in various ways to determine event(s) to be presented to users. These processes can be useful in view of the enormous amounts of data available to users. At any given time, there may be many thousands of system events, messages, posts, images, videos, articles, and other data elements presentable to a given user in a VIs. Accordingly, it can be desirable to identify the most relevant event(s) for presentation, in some cases limiting the identification to one or more particular event streams.

Figure 15:
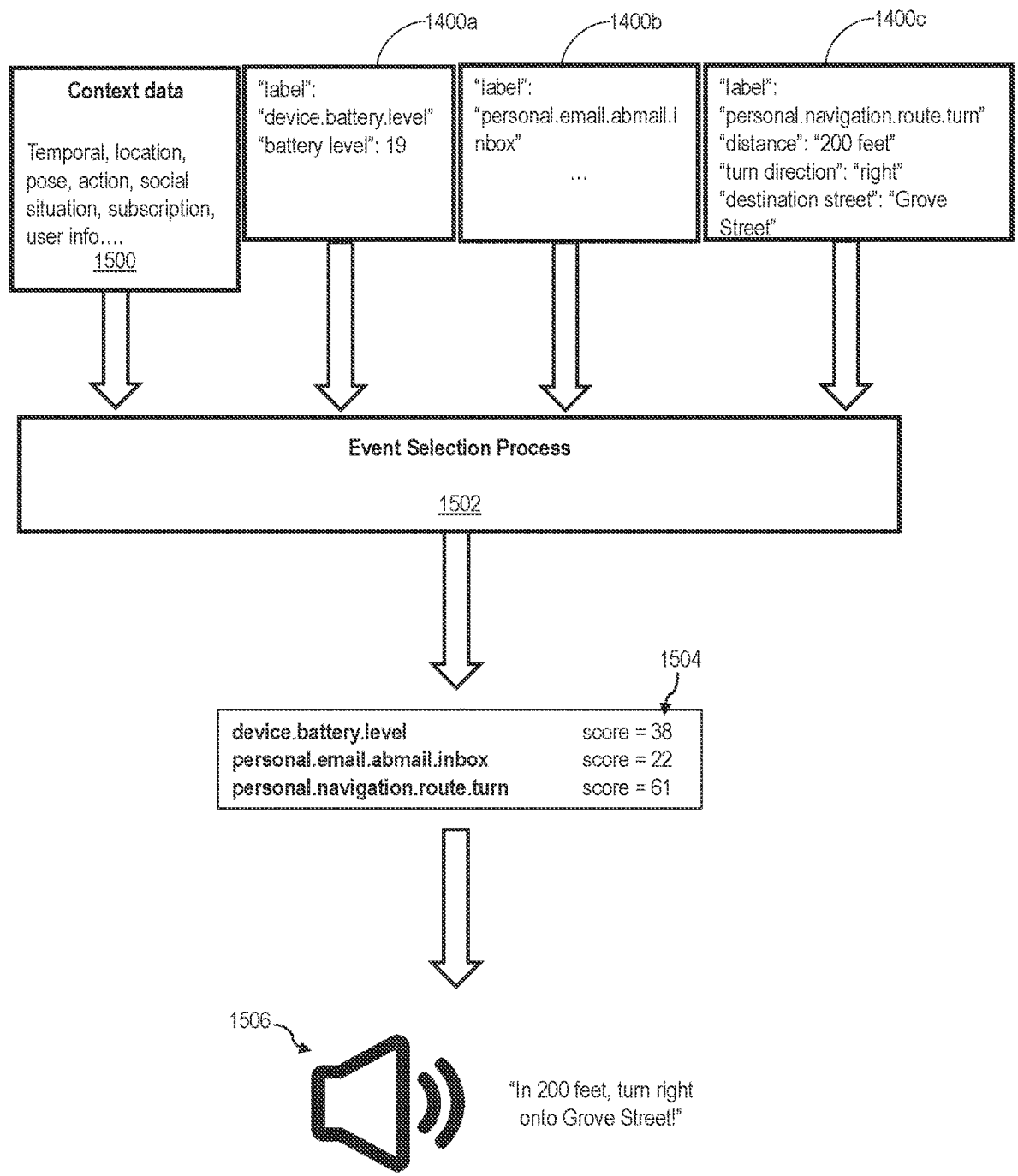
FIG. 15 is a diagram of an example of event selection, according to some implementations of this disclosure.

As shown in FIG. 15, multiple events 1400a, 1400b, and 1400c are input into an event selection process 1502. Another input to the event selection process is context data 1500. As noted above, context data 1500 can include data from sensor of a wearable multimedia device, such as data from data flows provided by sensors as shown in FIG. 8. For example, the context data 1500 can include a current location of the wearable multimedia device (in absolute terms (e.g., GPS coordinates) and/or in reference to an object, such as an object recognized by the multimedia wearable device or by cloud computing platform 102), images/video captured by the multimedia wearable device, a pose of a user of the multimedia wearable device (e.g., pointing at an element in a field of view of camera(s) of the multimedia wearable device), and/or sounds captured by the multimedia wearable device. However, in some implementations the context data 1500 includes one or more other types of data.

For example, in some implementations the context data 1500 includes calendar and other temporal data, such as upcoming appointments, holidays, restaurant and hotel reservations, flight bookings, and alarms. Temporal data can be obtained by the cloud computing platform 102, such as by querying user data stored in the databases 106 and/or by receiving the data from third party platforms 105. Temporal data can instead or additionally be provided by applications of wearable multimedia devices 101. Using temporal data in the context data (e.g., in comparison to a current time), temporally relevant events can be identified, such as deadlines falling within a certain period of time and upcoming alarms.

In some implementations, the context data 1500 includes a social situation of a user of the wearable multimedia device. For example, the wearable multimedia device and/or the cloud computing platform 102 can determine a location of the wearable multimedia device in comparison to locations of other wearable multimedia devices operated by other users and, based on the locations (e.g., based on proximity of the locations over a period of time), determine one or more other users with whom the user is interacting. Events related to the other users, such as photos of the other users, posts by the other users, media items "liked" by the other users, and upcoming calendar appointments shared with the other users, can then be determined to be relevant for presentation. Social situation determination can instead or alternatively be based on facial recognition or other biometric recognition of the other users in images/video captured by the wearable media device, in order to identify other users with whom the user is interacting. Social situation determination can instead or alternatively be based on communication between wearable multimedia devices (or other wearable multimedia devices) of the user and of the other users, such as handshake protocols (e.g., using Bluetooth or NFC signals) between the devices that establish proximity to one another.

In some implementations, the context data 1500 includes data indicative of one or more activities being performed by a user of the multimedia wearable device. For example, the wearable multimedia device and/or the cloud computing platform 102 can determine the activities based on interactions by the user with one or more applications of the multimedia wearable device, based on data captured by sensors of the multimedia wearable device (including images, video, audio, and/or motion), and/or based on other types of data, such as wireless signals received at the multimedia wearable device (e.g., NFC signals indicative of a payment operation). Based on data indicative of current activities, relevant events can be presented, such as presenting navigation directions when a user is driving or in a transit facility (a determination that can be made in conjunction with sensor-based location data), presenting a payment application when a user is making a payment, or presenting an encyclopedia search page when a user is drafting a document.

Other types of data can instead or additionally be included in the context data 1500. For example, in some implementations, user-specific information, such as user interests, user demographic information, user history (e.g., search history and internet browsing history), and/or user event customization settings can be included in the context data 1500 to determine event relevance. User event customization settings can allow users to provide feedback and/or instructions regarding events, such as "show me every event from event stream news.politics," "this event is not helpful to me right now," "I like seeing this event," and "hide events from personal.email for one week."

Based on the context data 1500 and a set of potential events for selection (e.g., events included in one or more selected streams), in the event selection process 1502, one or more events are identified for presentation on a wearable multimedia device. For example, the event selection process 1502 can include the identification of the most relevant event, the most relevant predetermined number of events, and/or the events having relevance above a threshold value.

In the example of FIG. 15, relevance scores 1504 are determined for each event 1400a, 1400b, 1400c. Event 1400a, associated with a battery level of 19%, is determined to have a score of 38; a lower battery level can result in higher relevance scores. Event 1400b, associated with newly-received email, is determined to have a relevance score of 22; this score can be based, for example, on analysis (e.g., machine learning-based analysis) of the email, such that, for example, work-related emails can be determined to be more relevant than marketing emails. Event 1400c, associated with an upcoming turn during driving navigation, is determined to have a relevance score of 61; because the turn occurs in 200 feet, event 1400c is highly relevant.

Accordingly, content of event 1400c is presented by the wearable multimedia device (1506). In this example, presentation of the content includes an audio message output by the wearable multimedia device. Presentation can instead or alternatively include display on a display screen, projection onto a surface as part of a VI, presentation as part of an AR/VR overlay, or any other suitable type of presentation. In some implementations, the most-relevant event is presented. In some implementations, a set of events are presented based on their respective relevance scores.

Figure 16A:
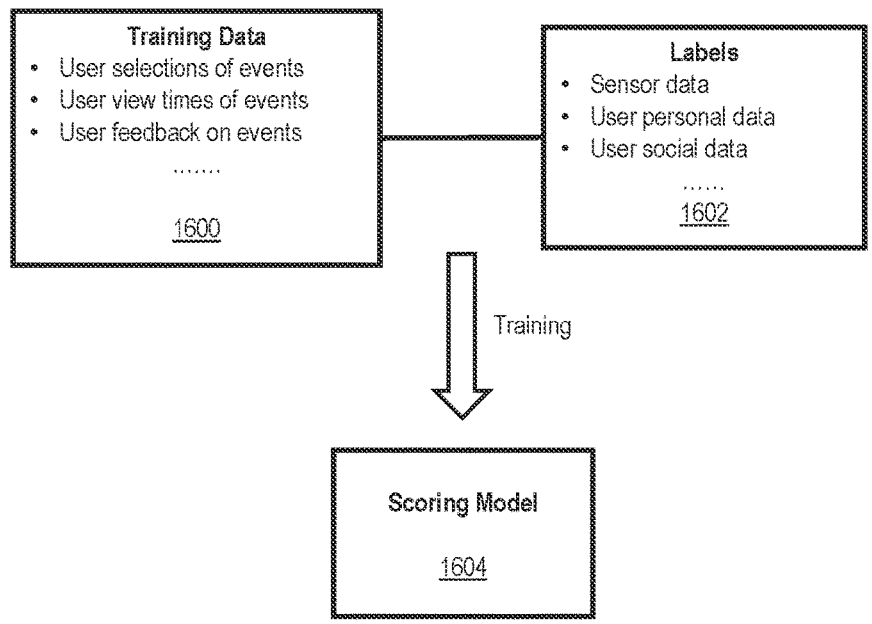
FIG. 16A is a diagram of an example of scoring model training, according to some implementations of this disclosure.

In some implementations, the event selection process 1502 includes a machine learning component, such as one or more machine learning models. As shown in FIG. 16A, a scoring model 1604 can be trained based on training data 1600 and corresponding labels 1602. The training data includes data indicative of a relevance of events that have been presented to users, such as whether a user made a selection on an event (e.g., watched a video included in an event or selected a link included in an event), how long a user viewed an event (where longer view times can be indicative of higher relevance), user feedback on events (e.g., "liking" or "disliking" event"), and/or other relevance-indicating metrics. The training data 1600 can include data specific to a user for whom the scoring model 1604 is being trained, and/or data from other users.

The labels 1602 correspond to the training data 1600. For example, each element included in the training data 1600 can include one or more corresponding labels 1602. The labels 1602 include context data associated with presentation of the events referenced in the training data 1600. For example, an element of the training data 1600 can indicate that a particular event, having a particular label, was presented to a user, and that the user selected a link in the event. The labels 1602 can then include context data corresponding to that presentation, such as sensor data (e.g., a location of the user before and/or during presentation of the event, and video captured by the wearable multimedia device before and/or during presentation of the event), social data (e.g., whether the user was in a social interaction with friends during presentation of the event), activity data (e.g., one or more activities being performed by the user before and/or during presentation of the event), and/or personal data of the user (e.g., demographic data such as age, gender, and nationality, interests of the user, etc.).

The training data 1600 and labels 1602 are used to train a scoring model 1604. The scoring model 1604 learns to identify which event characteristics (e.g., event content, event labels, and/or one or more categories indicated by the event labels) indicate event relevance to a user, given a set of context data. In some implementations, the scoring model 1604 learns to identify which event stream characteristics (e.g., a label corresponding to the event stream, one or more categories corresponding to the event stream, and/or content of events included in the event stream) indicate event stream relevance to a user, given a set of context data. The scoring model 1604 can include any suitable machine learning network or combination of machine learning networks, such as a multilayer perceptron (MLP), a convolutional neural network (CNN), and/or a recurrent neural network (RNN). In some implementations, the training includes iteratively adjusting weights of nodes in one or more layers of one or more learning networks such that the values of one or more loss functions that depend on the weights are reduced (e.g., minimized).

The scoring model 1604 can be a generic scoring model used to determine relevance scores for many users, or can be a personalized scoring model for use for a specific user. In some implementations, when the scoring model 1604 corresponds to a specific user, training data 1600 corresponding to the specific user is weighted more heavily than training data 1600 corresponding to other users when training the scoring model 1604, so as to have more influence on parameters of the trained scoring model 1604. This can make the scoring model 1604 more responsive to the particular relevance preferences of the specific user.

Figure 16B:
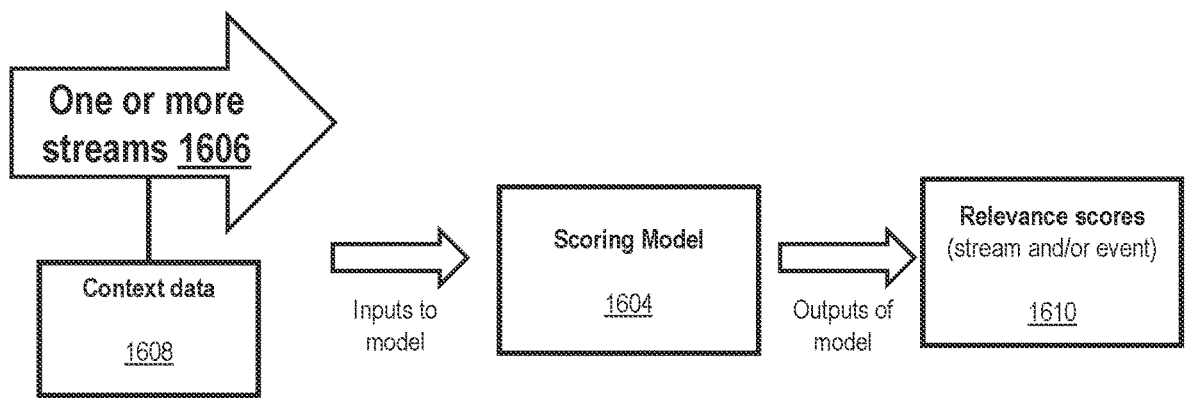
FIG. 16B is a diagram of an example of use of a scoring model, according to some implementations of this disclosure.

As shown in FIG. 16B, the trained scoring model 1604 can be used to determine relevance scores for individual events, for event streams as a whole, or for both. One or more event streams 1606, such as a single event stream like event stream 1102, multiple event streams such as the streams corresponding to event feeds 1300, 1302, and 1306, or a unified event stream such as event stream 1402, are provided as an input to the scoring model 1604. In some implementations, events themselves can be provided as input, without requiring a reference to a particular event stream. A set of context data 1608 (including one or more types of context data as described for context data 1500 and/or labels 1602) is also provided as input.

Based on the one or more event streams 1606 (or individual events) and the context data 1608, the scoring model 1604 determines relevance scores 1610 for one or more events and/or for one or more event streams. An example of event scoring is shown in FIG. 15; the context data 1500 and the events 1400a, 1400b, 1400c are input into the scoring model 1604 to obtain, as outputs of the scoring model 1604, the relevance scores 1504. When an event stream is input into the scoring model 1604, the scoring model 1604 can determine relevance scores for events of the event stream. In event stream scoring, context data and one or more events of an event stream are provided as inputs to the scoring model 1604, and the scoring model provides, as output, a relevance score of the event stream as a whole. These stream-based relevance scores can be used, for example, to provide recommendations to users to follow certain event streams that are determined to be highly relevant to the users. Note that event stream data is included in the training data 1600, because the labels of the events in the training data 1600 correspond to event streams.

Figure 17:
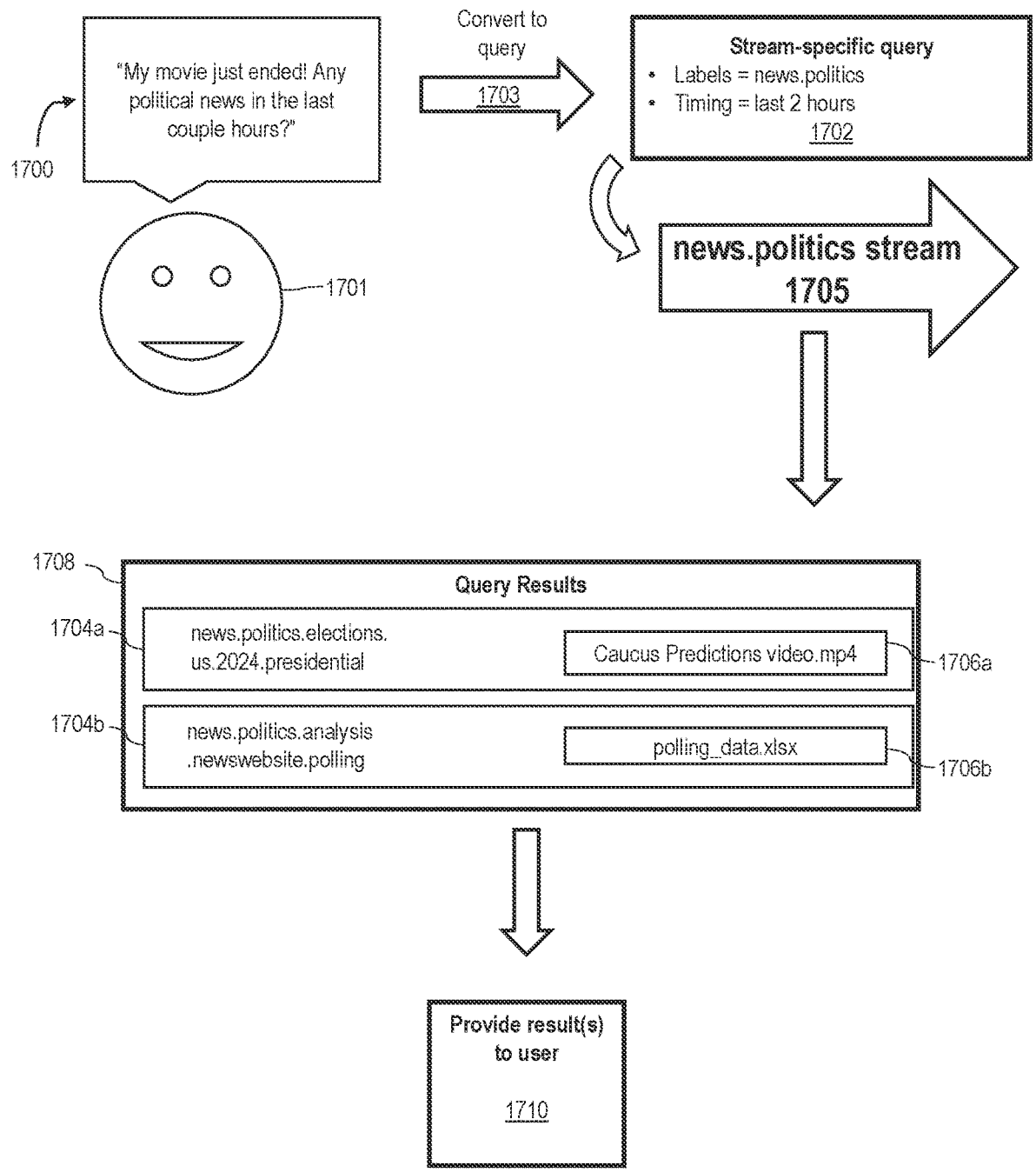
FIGS. 17-18 are diagrams of examples of query processes, according to some implementations of this disclosure.

Event streams and category-based labeling of events can be used to improve data queries. When a query request is received by a system such as a wearable multimedia device 101 or a cloud computing platform 102, the system can perform the query based on events streams and labels, such as by filtering events by event streams, labels, and/or categories included in labels. As shown in FIG. 17, a query request 1700 is provided by a user 1701, e.g., provided verbally by the user 1701 and detected using a microphone of a multimedia wearable device. Processing 1703 is performed on the query request 1700 to convert the query request 1700 into a query 1702. For example, the processing 1703 can include semantic analysis, machine learning, term recognition, and/or other speech/text recognition processes known in the art.

The processing 1703 can include determining one or more categories, labels, and/or event streams associated with the query, and/or other search conditions of the query. In the example of FIG. 17, it is determined that the query 1702 should be limited to the event stream "news.politics" 1705. Events in the event stream "news.politics" 1705, which have labels including the nested categories "news.politics," will be searched to obtain results for the query 1702. In some implementations, It is also determined that the query 1702 will include a temporal search condition: events with timestamps in the past two hours are searched as part of the query 1702. Other types of search conditions that can be included in various implementations include media types (e.g., events including image content, video content, or audio content); search terms (e.g., content of the events including one or more words or phrases); sources (e.g., events from particular users or content providers); depicted subjects (e.g., people, objects, and/or locations depicted in images or videos of the events); or any other suitable type of search condition.

In some implementations, a query is conducted on a unified event stream including all available events (e.g., all events, or all events to which a user has read access), such as unified event stream 1402.

Based on the query 1702, query results 1708 are obtained. The query results 1708 include one or more events that satisfy the search conditions of the query 1702. In this example, the query results include two events 1704a, 1704b having respective content 1706a, 1706b. Each event 1704a, 1704b is included in the "news.politics" event stream 1705, and the label of each event 1704a, 1704b also includes other categories as sub-categories of "news.politics." Content 1706a, 1706b of the events 1704a, 1704b are provided (e.g., presented in a VI) to a user, such as a user of the wearable multimedia device to which the query request 1700 was provided. In some implementations, events included in query results are analyzed to determine relevance scores of the events, and one or more of the events are provided based on the relevance scores, such as a highest-scoring event. In some implementations, events are provided in a results feed in an order corresponding to their respective relevance scores.

Query generation by processing 1703 and querying to obtain query results 1708 can be by a remote computing system such as cloud computing platform 102 and/or third party platforms 105. For example, as shown in FIG. 2, applications 211-217 can receive images, videos, and/or audio captured by the wearable multimedia device and transmitted to the ingestion server 205. The applications 211-217 can be processes of the cloud computing platform 102, third party platforms 105, or combinations thereof. Processing performed by the applications 211-217 can include identifying query requests in the images, videos, and/or audio and converting the query requests to queries. Processing performed by the applications 211-217 can instead or additionally include performing the queries, e.g., by querying databases 106 with the search conditions of the queries. Query results (e.g., events and/or event streams) obtained at the cloud computing platform 102, the third party platforms 105, or both, can be transmitted to the wearable multimedia device 101 for presentation to a user (1710).

Alternatively, or in addition, query generation and/or querying to obtain query results can be performed by a wearable multimedia device 101. For example, the wearable multimedia device 101 can monitor images, video, and/or audio captured by the wearable multimedia device 101 and identify a query request in the images, video, and/or audio. The wearable multimedia device 101 can send the query request to cloud computing platform 102 and/or third party platforms 105 for query generation, or the wearable multimedia device 101 can directly generate the query. The wearable multimedia device 101 can obtain query results by querying locally-stored events and/or event streams with search conditions of the query, can query databases 106 with the search conditions, or can transmit the generated query to the cloud computing platform 102 and/or the third party platforms 105 so that the cloud computing platform 102 and/or the third party platforms 105 queries the databases 106 with the search conditions.

Figure 18:
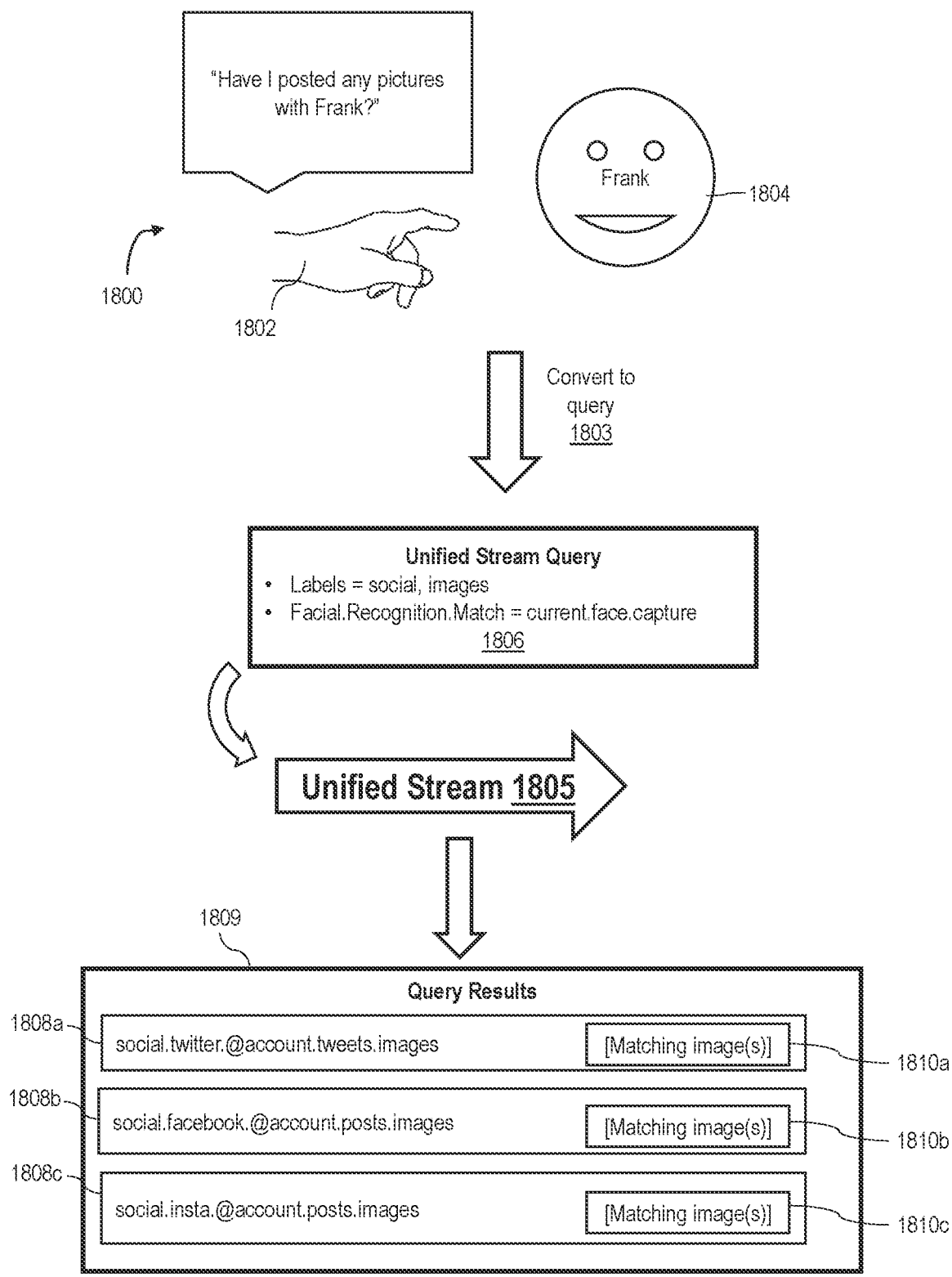

FIG. 18 shows another example of event querying using events with category-indicating labels. A user speaks a query request 1800 and indicates, by a gesture 1802, a subject 1804 in the vicinity of the user. The query request 1800 is captured by a microphone of a wearable multimedia device, and the gesture 1802 is captured by a camera of the wearable multimedia device. Audio of the query request 1800 and image(s)/video of the gesture 1802 are transmitted from the wearable multimedia device to cloud computing platform 102 and/or third party platforms 105. The platforms perform processing to identify the query request 1800 and the gesture 1802 in the transmitted media and, based on the query request 1800 and the gesture 1802, convert the query request 1800 to a query 1806 (1803).

In this example, the query 1806 is a unified stream query, meaning that the query is performed by searching a unified stream 1805 (e.g., the unified event stream 1402). The query 1806 includes two search conditions. First, the query 1806 searches for events whose labels include the categories "social" and "images." This search condition does not require a particular combination of other categories that may be included in the labels, such that the search space of the search condition is not an event stream defined strictly by a single hierarchical combination of categories. Rather, events 1808a, 1808b, and 1808c (shown in query results 1809), having labels "social.twitter.@account.tweets.images," social.facebook.@account.posts.images, and "social.insta.@account.posts.images," each satisfy this search condition, although the events 1808a, 1808b, and 18s08c are not included in a single hierarchically-defined event stream.

A second search condition of the query 1806 defines content of events in the query results 1809. As part of generation of the query 1803, the subject 1804 indicated by the gesture 1802 is identified in media captured by the wearable multimedia device 101. The second search condition defines that events in the query results 1809 include the subject 1804. For example, querying the unified data stream 1805 can include object recognition (e.g., facial recognition), tag searching (e.g., to identify images tagged as including the subject 1804), and/or another suitable content identification method. Images 1810a, 1810b, and 1810c that include the subject 1804 and that are included in events 1808a, 1808b, and 1808c satisfy the category-based search condition are identified, and the query results 1809 are provided to the wearable multimedia device 101 for presentation to a user. For example, the images 1810a, 1810b, and 1810c can be transmitted from the cloud computing platform 102 to the wearable multimedia device 101, which includes one or more of the images 1810a, 1810b, and 1810c in a VI projected by the wearable multimedia device 101.

Figure 19:
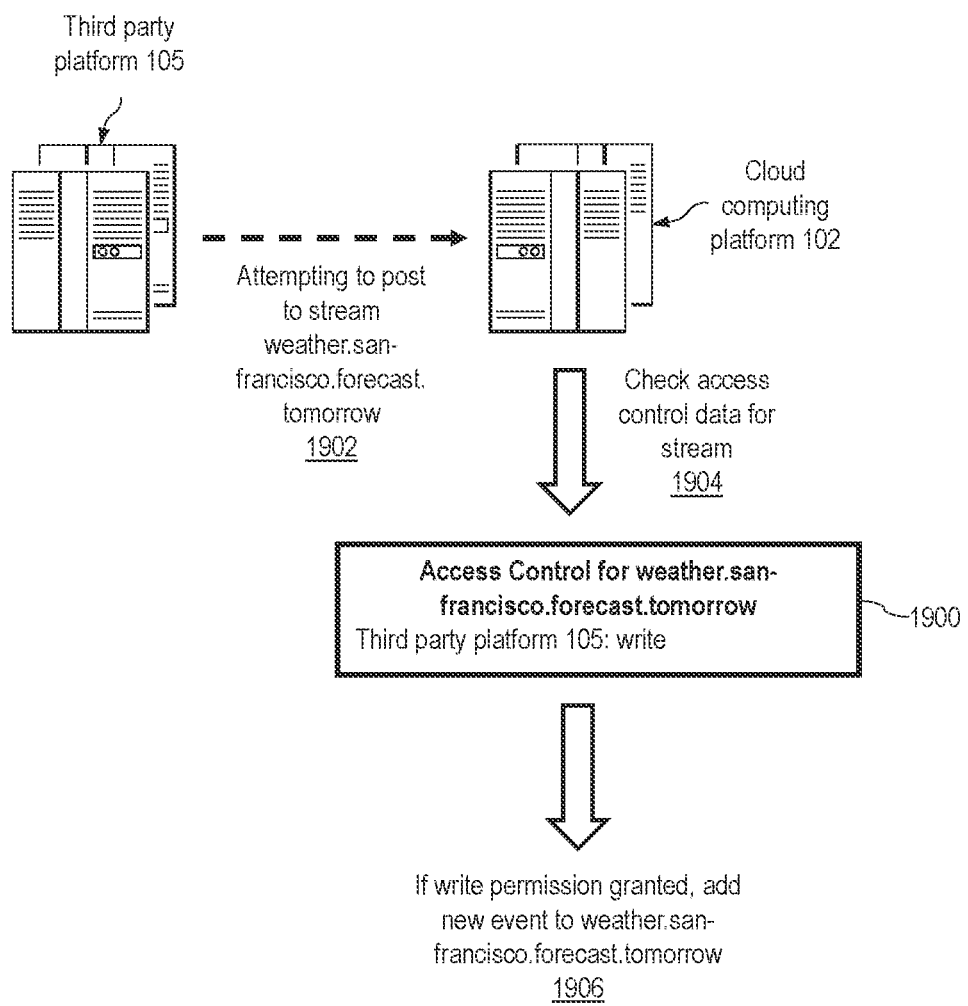
FIGS. 19-20 are diagrams of examples of access control processes, according to some implementations of this disclosure.

At noted above, some implementations according to this disclosure include access control measures that limit read interactions, write interactions, and/or other interactions with events/event streams. FIG. 19 illustrates an example of write access control. A third party platform 105 (e.g., a weather website) desires to post a new event to the stream "weather.san-francisco.forecast.tomorrow," to which users can subscribe to be shown the following day's weather. The third party platform 105 transmits the event (which, for example, can have a label "weather.san-francisco.forecast.tomorrow") to cloud computing platform 102 (1902). The cloud computing platform 102 obtains access control data 1900 associated with the stream "weather.san-francisco.forecase.tomorrow" and, based on the access control data 1900, determines whether to add the event to the stream (1904). In this example, the access control data 1900 indicates that the third party platform 105 has write access to the stream, and, accordingly, the cloud computing platform 102 adds the event to the stream (1906). For example, the cloud computing platform stores the event or a pointer to a storage location of the event in an event stream data object, such as an event stream data object stored in the databases 106.

In some implementations, category-based and/or hierarchical labels can improve access control processing efficiency. Access control can be provided at varying hierarchical levels, such as for stream "weather.san-francisco" and/or for stream "weather.san-francisco.forecast," and, in some implementations, access control settings for higher hierarchical categories can be determinative of access control settings for lower hierarchical categories. For example, in some implementations, if a third party platform 105 lacks write access for stream "weather.san-francisco," it can be determined that the third party platform lacks write access for sub-categories of that stream, such as "weather.san-francisco.forecast" and "weather.san-francisco.history." Conversely, in some implementations, if the third party platform 105 has write access for the stream "weather.san-francisco," write access for sub-categories of that stream can be determined on a stream-by-stream basis based on access control data corresponding to each stream. Accordingly, in some implementations, in a process of checking access control data such as the process shown in FIG. 19, access control data corresponding to a stream of a higher hierarchical level can be checked to determine access control data for multiple streams at lower hierarchical levels, reducing processing. Other hierarchy-based access control relationships are also within the scope of this disclosure. For example, in some implementations, access control data can also be obtained for non-hierarchical event streams, such as the event stream corresponding to event feed 1306, which includes events having labels that include both the "sports" category and the "history" category.

The flexibility provided by category/label-based and stream-based access control methods can improve data security and privacy, because access can be controlled flexibly for individual categories, particular sets of categories, particular event streams, particular sets of event streams, and for classes of event streams based on hierarchical event stream labels. This allows for access control settings to be provided in precisely-defined combinations for customized data access regulation.

Figure 20:
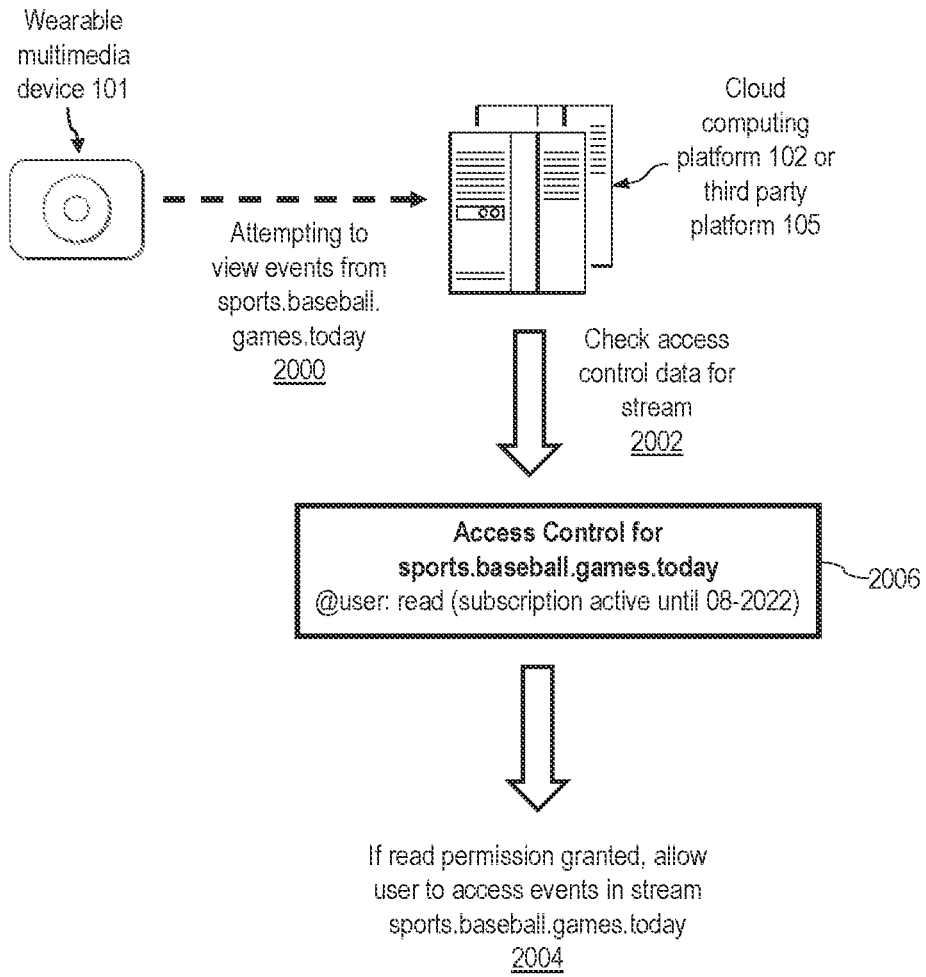

Another example of event stream access control is shown in FIG. 20. A wearable multimedia device 101 operated by a user attempts to view events from a stream "sports.baseball.games.today" (2000). For example, the wearable multimedia device 101 transmits a request to access the stream to a cloud computing platform 102 or a third party platform 105. The platform checks access control data 2006 associated with the event stream (2002). In some implementations, access control can be based on marketplace/subscription services. For example, a user can subscribe to an event stream, providing the user read access to the event stream. As another example, an application or third party platform can purchase read access to an event stream to access data of the event stream. For example, a third party platform can purchase read access to one or more social media event streams of a user to access posts by the user and thus gain marketing information related to the user.

In the example process of FIG. 20, a user of the wearable multimedia device 101 has an active subscription to the requested event stream. Accordingly, the user is granted access to events in the event stream (2004). For example, the cloud computing platform 102 or third party platform 105 transmits events of the event stream to the wearable multimedia device 101.

In some implementations, results of access control queries are temporarily stored in a cached form (e.g., with a predetermined time-to-live that can be shared between event streams or can be event stream-specific). When cached access control data is available, access requests (e.g., read or write requests) can be processed by querying the cached access control data. This method can improve system performance by reducing a frequency of querying non-cached access control data stored in association with event streams.

Figure 21:
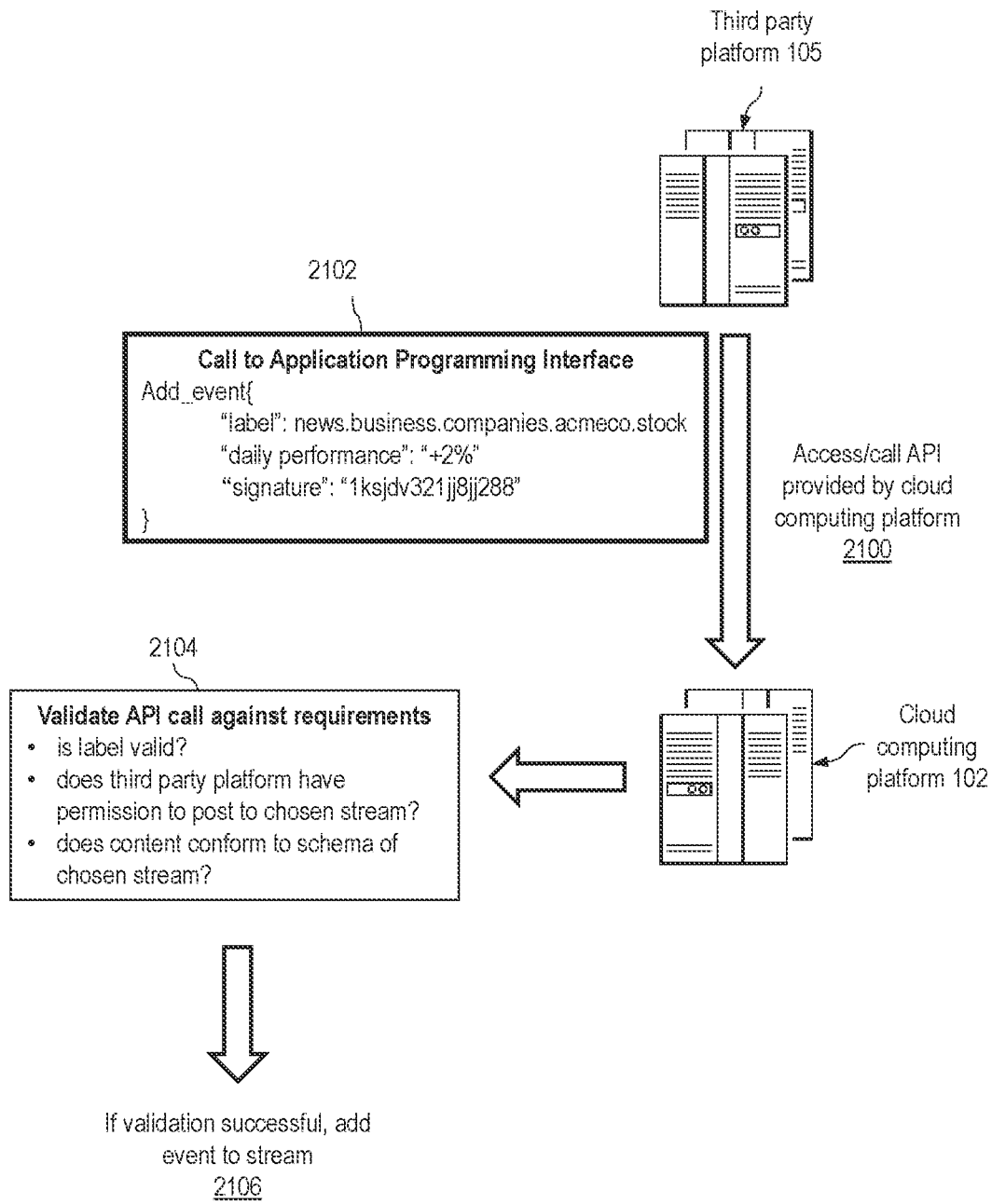
FIGS. 21-22 are diagrams of examples of event generation, according to some implementations of this disclosure.

As noted above, in some implementations, an API is used by applications and third party platforms to provide events for integration into event streams. As shown in FIG. 21, a third party platform 105 provides an API call 2102 to an API provided by cloud computing platform 102 (2100). The API call 2102 includes data defining a new event, such as a label of the event, content of the event, and, in some implementations, a signature or other cryptographic authenticator of the identity of the third party platform 105.

The cloud computing platform 102 receives the API call 2102 and validates the API call 2102 for conformity to one or more requirements (2104). For example, in some implementations, the cloud computing platform 102 determines whether a label included in the API call 2102 conforms to the common format of the labels, such as being dot-delimited. In some implementations, the cloud computing platform 102 determines whether the label represents a correct hierarchy of categories: for example, "news.business.photos" can represent an ordered hierarchy of sequential subcategories, while "photos.news" can represent a disordered hierarchy that does not conform to the common format of labels. In some implementations, the cloud computing platform 102 determines whether categories included in the label are included in a set of allowable categories, such as a set of existing categories.

In some implementations, the cloud computing platform 102 determines whether the label corresponds to an existing event stream. If not, in some implementations, the cloud computing platform 102 determines to not add the new event to an event stream; in other implementations, the cloud computing platform 102 generates a new event stream corresponding to the label (e.g., generates a new event stream object corresponding to a label, access control data, and schema data), and adds the event to the new event stream.

As another example of validation, in some implementations the cloud computing platform 102 determines whether the third party platform 105 has permission to post in the event stream specified by the label included in the API call 2102. For example, the cloud computing platform 102 can authenticate the third party platform 105 based on a signature (e.g., a public-key or private-key signature) included in the API call 2102, obtain access control data for the specified event stream, and, if the third party platform 105 is authenticated, determine whether the access control data provides the third party platform 105 with write access to the event stream.

In some implementations, the cloud computing platform 102 determines whether content of the event (as included in the API call 2102) conforms to a schema of the event stream to which the event is to be added. For example, the cloud computing platform 102 can identify one or more attributes included in the API call 2102, obtain schema data for the event stream, and determine whether the attributes themselves and/or values/content of the attributes conform to expected attributes and attribute TYPES as specified in the schema data. In the example of FIG. 21, attribute "daily performance" of the API call 2102 has a TYPE percentage; the cloud computing platform 102 can determine whether schema data for the stream "news.business.companies.acmeco.stock" indicates (i) that events in the stream have an attribute "daily performance," and (ii) if so, that the attribute "daily performance" has the TYPE percentage.

If the API call 2102 satisfies these and/or other requirements, validation is determined to be successful, and the cloud computing platform 102 adds the event to the specified event stream (2106). In some implementations, if validation fails, the cloud computing platform 102 determines not to add the new event to an event stream. In other implementations, if validation fails, the cloud computing platform 102 can perform conversion processing to attempt to cause content of the API call 2102 to be validated successfully. For example, if categories in the label are found to not be ordered in a proper hierarchy, the cloud computing platform 102 can re-order the categories to place them in the proper hierarchy.

Other implementations of APIs and API calls are also within the scope of this disclosure. For example, in some implementations, in order to ease burdens on third party platforms to provide correctly-formatted API calls, the API call 2102, instead of having to include an entire label corresponding to a specific event stream, instead can include a set of one or more tags describing the content of the event. The cloud computing platform 102 can associate at least some of the tags with corresponding categories, structure the categories into a hierarchically-organized label, and add the event to the event stream indicated by the generated label.

Figure 22:
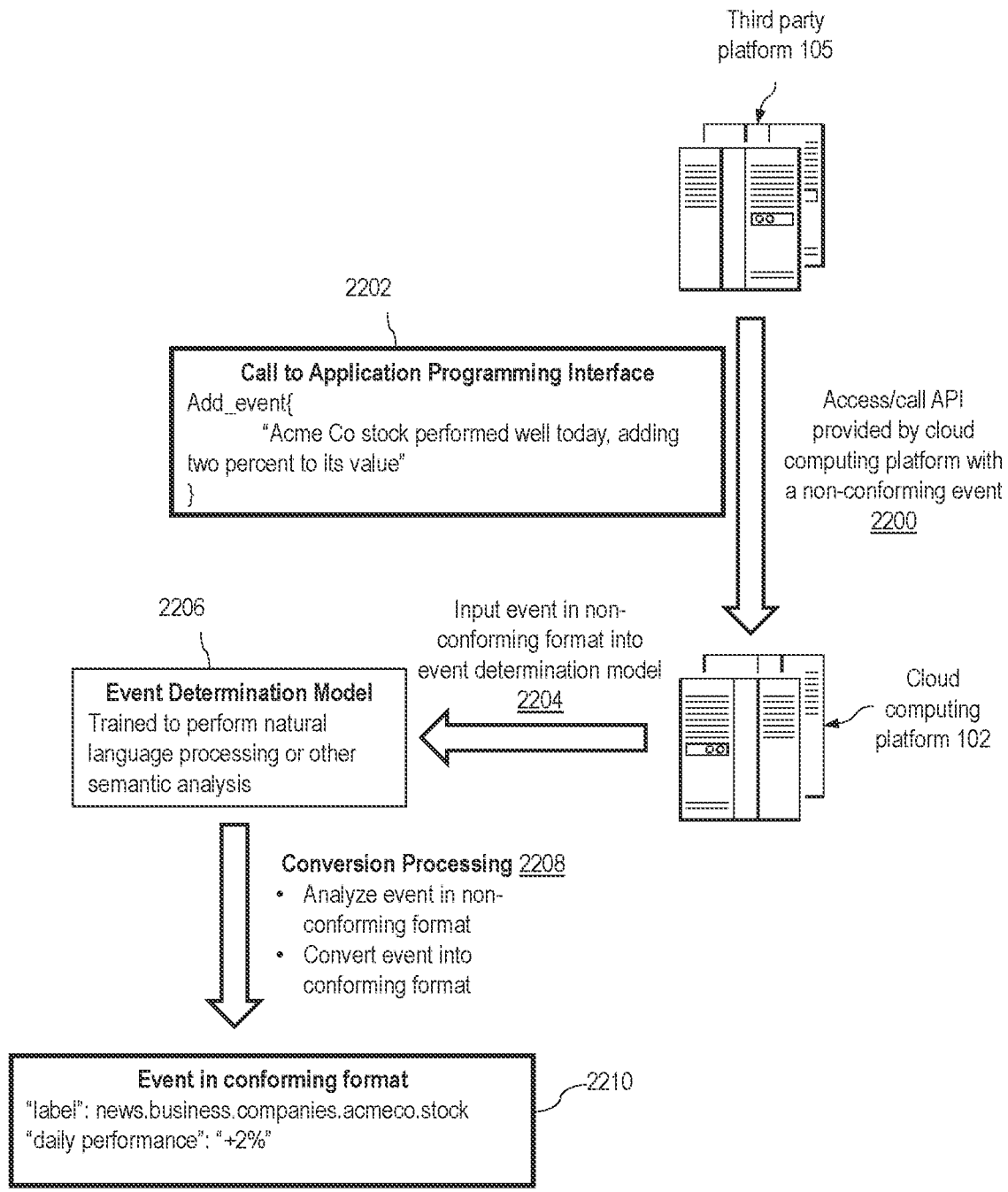

As another example, as shown in FIG. 22, a third party platform 105 provides an API call 2202 to a cloud computing platform 102 (2200). An event specified by the API call 2202 is non-conforming to event requirements in one or more ways. For example, event content of the API call 2202 is limited to a string "Acme Co stock performed well today, adding two percent to its value," without specification of an event stream to receive the event, categories/labels of the event, specific attributes of the event, etc.

The cloud computing platform inputs the non-conforming event content of the API call 2202 into an event determination model 2206 (2204). The event determination model 2206 includes one or more machine learning networks trained to perform conversion processing 2208, to analyze the event in the non-conforming format and convert the event into a conforming format. For example, the event determination model 2206 can be configured to perform natural language processing (NLP) or another semantic analysis method to identify concepts/entities referenced in the non-conforming event and determine a meaning of the non-conforming event. The conversion processing 2208 produces a conforming event 2210 having a label of hierarchical categories and an attribute with a TYPE conforming the schema data of the event stream specified by the label.

Note that the processes described with respect to FIGS. 19-22, besides being performed by the cloud computing platform 102 and/or the third party platform 105, in some implementations can instead or additionally be performed by a wearable multimedia device.

Event streams can accumulate events over time. In some implementations, processing is performed to limit the sizes of event streams. In some implementations, the cloud computing platform 102 removes one or more events from an event stream when the event stream and/or the removed events satisfy a removal condition, such as the event stream reaching a threshold size or age. When the removal condition is satisfied, in some implementations one or more oldest events are removed from the event stream; additionally, or alternatively, relevance scores of the events of the event stream can be determined, and one or more lowest-relevance events can be removed. In some implementations, the most significant events in an event stream (e.g., as determined based on relevance scores) can be filtered out and preserved, such as in an archive.

Additional Example Processes

Figure 23:
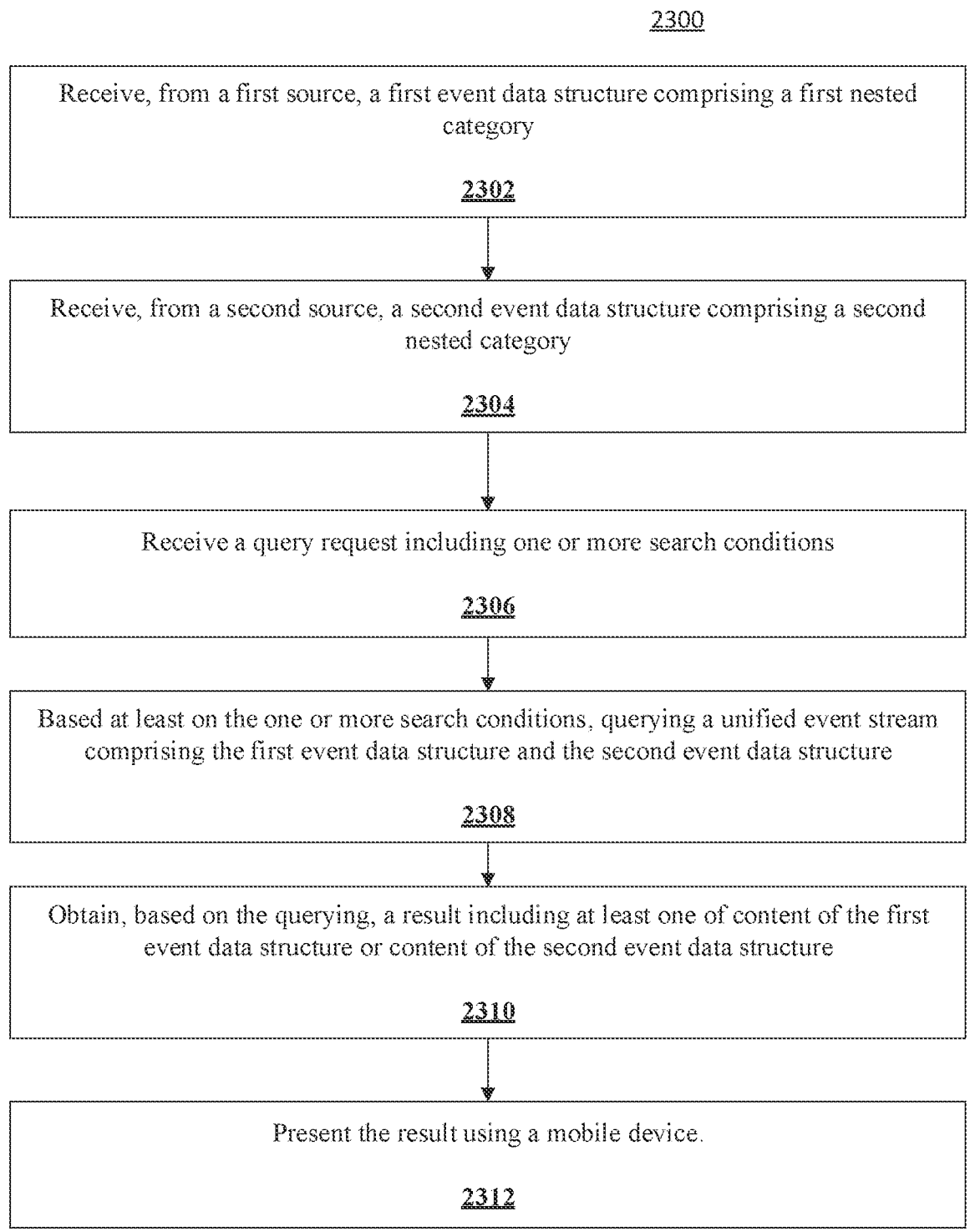

FIG. 23 is a flow diagram of an example of a process 2300 for querying an event stream, according to some implementations. In some implementations, process 2300 is implemented using wearable multimedia device 101 and using a cloud computing platform 102 and/or a third party platform 105, as described in reference to FIGS. 1-9.

According to the process 2300, a first event data structure including a first nested category is received from a first source (2302). For example, the first nested category can be a category such as "social," "personal," "news," "polling," or any other category included in an event label as described in reference to FIGS. 11-22. The first source can be a third-party platform 105, an application of a wearable multimedia device 101, or a sensor or media capture device of the wearable multimedia device 101, e.g., as shown in FIG. 5. In some implementations, the first event data structure is received by transmission over a network, such as network 103.

A second event data structure including a second nested category is received from a second source (2304). For example, the second source can be different from the first source, such as a different sensor or media capture device of the wearable multimedia device 101 or a different third-party platform 105. The second nested category can be different from the first nested category. In some implementations, a label of the first event data structure and a label of the second event data structure share at least one nested category. For example, the first nested category and the second nested category can each be a different sub-category of a common super-category in the labels.

A query request is received including one or more search conditions (2306). For example, the query request can be a verbal query request 1700 as shown in FIG. 17 or a verbal query request 1800 in conjunction with a gesture 1802 as shown in FIG. 18. The query request can be obtained at a wearable multimedia device 101 and transmitted to the cloud computing platform 102 or a third party platform 105. The one or more search conditions can include any one or more of the search conditions described with respect to FIGS. 17-18, such as a content condition, a category condition, an event stream condition, and/or another condition.

Based at least on the one or more search conditions, a unified event stream is queried, the unified event stream including the first event data structure and the second event data structure (2308). For example, the unified event stream can be a unified event stream such as unified event stream 1402, including events with various different labels and provided by various different sources.

Based on the querying, a result including at least one of content of the first event data structure or content of the second event data structure is obtained (2310). For example, the one or more search conditions can specify a particular category, and at least one of the first nested category or the second nested category matches the particular category. As another example, the one or more search conditions can include a temporal condition and/or a content condition, and at least one of the first event data structure or the second event data structure satisfies the temporal condition and/or the content condition.

The result is presented to a user using a mobile device (2312). For example, the result is transmitted from the cloud computing platform 102 or the third-party platform 105 to the wearable multimedia device 101, and the wearable multimedia device 101 presents the result to the user as part of a projected VI or with an audio message. In some implementations, the result is presented in the form of a collated feed, as shown in FIGS. 13A-13C.

FIG. 24 is a flow diagram of an example of a process 2400 for determining content to present, according to some implementations. In some implementations, process 2400 is implemented using wearable multimedia device 101 and using a cloud computing platform 102 and/or a third party platform 105, as described in reference to FIGS. 1-9.

In the process 2400, a first event data structure is obtained (2402). For example, the first event data structure can be obtained at a wearable multimedia device 101 or at the cloud computing platform 102. The first event data structure can be provided by the wearable multimedia device 101 (e.g., by a sensor of the wearable multimedia device 101 or a process of the wearable multimedia device 101 based on sensor data), can be obtained by the cloud computing platform 102 from a database 106, or can be received at the cloud computing platform 102 from a third-party platform 105.

The first event data structure includes a first plurality of nested categories, the first plurality of nested categories including at least a first category and a second category, the first label associating the first content with the first category and the second category. For example, the first event data structure can include a label "category1.category2," where the label associates the first event data structure with the categories "category1" and "category2." In some implementations, "category2" is a sub-category of "category1."

A second event data structure is obtained (2404). The second event data structure includes second content and a second label including a second plurality of nested categories. The second plurality of nested categories includes at least a third category. The second label is different from the first label and associates the second content with the third category. Continuing the example provided for (2402), the second event data structure can include a label "category3" or a label "category2.category3," such that the second event data structure is associated with the category "category3." The second event data structure can be provided by the same source that provided the first event data structure, or a different source.

A context of a mobile device is determined (2406). For example, the mobile device can be a wearable multimedia device 101. The context can include any combination of data types of the context data 1500 and the labels 1602, such as temporal context data (including, for example, calendar events/appointments), location data, sensor data, pose data, one or more actions being performed by the user, a social situation of the user, a subscription status of the user with respect to one or more event streams, information about the user (e.g., demographic information), and/or other data types.

Based on the context, the first label, and the second label, at least one of the first content or the second content is determined for presentation to a user of the mobile device (2408). For example, as described in reference to FIG. 15, relevance scores can be determined for the first event data structure and the second event data structure based on the data structures and based on the context. Content of the event data structure having a higher relevance score can be determined for presentation. In some implementations, the content is determined for presentation by using a scoring model, such as the scoring model 1604 described in reference to FIGS. 16A-16B. Event selection can be performed by the mobile device (e.g., a wearable multimedia device), by the cloud computing platform 102, or by a third-party platform 105.

The at least one of the first content or the second content is presented to the user using the mobile device (2410). For example, the at least one of the first content or the second content is transmitted from the cloud computing platform 102 to the mobile device for presentation.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor. Method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed implementations may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
obtaining a first event data structure comprising first content and a first label that conforms to a predetermined label format, wherein the first label comprises a first plurality of nested categories, the first plurality of nested categories including at least a first category and a second category, the first label associating the first content with the first category and the second category, and
wherein the first label, based on the predetermined label format, indicates a first hierarchical relationship between the first category and the second category;

receiving a network call to an application programming interface (API), the network call providing, to a cloud computing system, second content for submission as an event;

at the cloud computing system, validating the network call for conformity to the predetermined label format, and determining, based on the validation, that the network call lacks a label conforming to the predetermined label format;

based on the second content, generating, at the cloud computing system, a second label that conforms to the predetermined label format, wherein the second label comprises a second plurality of nested categories, the second plurality of nested categories including at least a third category, wherein the second label is different from the first label and associates the second content with the third category, and wherein the second label, based on the predetermined label format, indicates a second hierarchical relationship between the third category and at least one other category;

generating a unified event stream comprising the first event data structure and a second event data structure that includes the second content and the second label, the unified event stream comprising a common repository of multiple types of event data from multiple sources, wherein event data in the unified event stream share the predetermined label format for querying and comparing the event data;

determining a context of a mobile device;

based on the context, the first hierarchical relationship, and the second hierarchical relationship, determining at least one of the first content or the second content to present using the mobile device;

providing the at least one of the first content or the second content from the cloud computing system to the mobile device; and presenting, using the mobile device, the at least one of the first content or the second content.

2. The computer-implemented method of claim 1, wherein the first hierarchical relationship comprises that the second category is a sub-category of the first category.

3. The computer-implemented method of claim 1, wherein the second plurality of nested categories further includes the first category, and wherein the second hierarchical relationship comprises that the third category is a sub-category of the first.

4. The computer-implemented method of claim 1, wherein determining the at least one of the first content or the second content to present comprises:

based on the first plurality of nested categories and the second plurality of nested categories, assigning a first relevance score to the first content and a second relevance score to the second content; and determining the at least one of the first content or the second content to present based on the first relevance score and the second relevance score.

5. The computer-implemented method of claim 4, comprising:

providing the context, the first label, and the second label to a machine learning model as inputs; and obtaining the first relevance score and the second relevance score as outputs of the machine learning model.

6. The computer-implemented method of claim 1, comprising:

receiving a request to access at least one event data structure having the first label;

accessing permission data associated with the first plurality of nested categories;

determining, based on the permission data, that a provider of the request has read access to an event stream associated with the first plurality of nested categories; and based on determining that the provider of the request has read access to the event stream associated with the first plurality of nested categories, providing the first event data structure to the provider of the request.

7. The computer-implemented method of claim 1, comprising:

accessing permission data associated with the first plurality of nested categories;

validating the network call against the permission data, to determine that a provider of the first event data structure has write access to an event stream associated with the first plurality of nested categories; and based on determining that the provider of the first event data structure has write access to the event stream associated with the first plurality of nested categories, adding the first event data structure to the event stream associated with the first plurality of nested categories.

8. The computer-implemented method of claim 1, comprising:

accessing schema data associated with the first plurality of nested categories;

determining that a data format of the first event data structure conforms to a data format specified in the schema data; and based on determining that the data format of the first event data structure conforms to the data format specified in the schema data, adding the first event data structure to an event stream associated with the first plurality of nested categories.

9. The computer-implemented method of claim 1, wherein obtaining the first event data structure comprises:

receiving first data;

accessing schema data associated with the first plurality of nested categories;

based on the first data, generating at least one attribute having a type specified in the schema data; and generating the first content comprising the at least one attribute.

10. The computer-implemented method of claim 1, wherein the context comprises at least one of a current time, a current location of the mobile device, a pose of a user, an action being performed by the user, a social situation of the user, or a subscription status of the user with respect to at least one of the first label or the second label.

11. The computer-implemented method of claim 1, wherein the first plurality of nested categories comprises a category indicating that the first content is associated with one of an operational state of the mobile device, or a particular interest category.

12. The computer-implemented method of claim 1, wherein the network call comprises a plurality of categories, and wherein generating the second label comprises re-ordering the plurality of categories, to obtain the second label.

13. The computer-implemented method of claim 1, wherein at least one of the first event data structure or the second event data structure includes content from a sensor of the mobile device.

14. The computer-implemented method of claim 1, wherein determining the at least one of the first content or the second content to present using the mobile device comprises determining a relevance score for an event stream corresponding to the first label.

15. The computer-implemented method of claim 1,
wherein a first schema data structure is associated with the first label, the first content conforming to the first schema data structure,
wherein a second schema data structure is associated with the second label, the second content conforming to the second schema data structure, and
wherein the first schema data structure is different from the second schema data structure.

16. The computer-implemented method of claim 15, wherein the first schema data structure and the second schema data structure define types of data included in the first content or the second content, respectively.

17. The computer-implemented method of claim 1, wherein generating the second label comprises:
   inputting the first content into at least one machine learning network, the at least one machine learning network trained to apply natural language processing to the first content to identify at least one entity referenced in the first content;
   generating a plurality of category labels based on the at least one entity; and
   arranging the plurality of category labels in an ordered combination, to obtain the second label.

18. A cloud computer system, comprising:
   at least one processor; and
   memory storing instructions that, when executed by the at least one processor, cause the at least one processor to perform operations comprising:
   obtaining a first event data structure comprising first content and a first label that conforms to a predetermined label format, wherein the first label comprises a first plurality of nested categories, the first plurality of nested categories including at least a first category and a second category, the first label associating the first content with the first category and the second category, and
      wherein the first label, based on the predetermined label format, indicates a first hierarchical relationship between the first category and the second category;
   receiving a network call to an application programming interface (API), the network call providing, to the cloud computing system, second content for submission as an event;
   at the cloud computing system, validating the network call for conformity to the predetermined label format, and determining, based on the validation, that the network call lacks a label conforming to the predetermined label format;
   based on the second content, generating, at the cloud computing system, a second label that conforms to the predetermined label format, wherein the second label comprises a second plurality of nested categories, the second plurality of nested categories including at least a third category, wherein the second label is different from the first label and associates the second content with the third category, and
      wherein the second label, based on the predetermined label format, indicates a second hierarchical relationship between the third category and at least one other category;
   generating a unified event stream comprising the first event data structure and a second event data structure that includes the second content and the second label, the unified event stream comprising a common repository of multiple types of event data from multiple sources, wherein event data in the unified event stream share the predetermined label format for querying and comparing the event data
   determining a context of a wearable multimedia device;
   based on the context, the first hierarchical relationship, and the second hierarchical relationship, determining at least one of the first content or the second content to present using the wearable multimedia device;
   providing the at least one of the first content or the second content from the cloud computing system to the wearable multimedia device; and
   presenting, using the wearable multimedia device, the at least one of the first content or the second content.

19. The computer system of claim 18, wherein the first hierarchical relationship comprises that the second category is a sub-category of the first category.

20. The computer system of claim 18, wherein the second plurality of nested categories further includes the first category, and wherein the second hierarchical relationship comprises that the third category is a sub-category of the first.

21. One or more non-transitory computer-readable media storing instructions that, when executed by at least one processor, cause the at least one processor to perform operations comprising:
   obtaining a first event data structure comprising first content and a first label that conforms to a predetermined label format, wherein the first label comprises a first plurality of nested categories, the first plurality of nested categories including at least a first category and a second category, the first label associating the first content with the first category and the second category, and
      wherein the first label, based on the predetermined label format, indicates a first hierarchical relationship between the first category and the second category;
   receiving a network call to an application programming interface (API), the network call providing, to a cloud computing system, second content for submission as an event;
   at the cloud computing system, validating the network call for conformity to the predetermined label format, and determining, based on the validation, that the network call lacks a label conforming to the predetermined label format;
   based on the second content, generating, at the cloud computing system, a second label that conforms to the predetermined label format, wherein the second label comprises a second plurality of nested categories, the second plurality of nested categories including at least a third category, wherein the second label is different from the first label and associates the second content with the third category, and
      wherein the second label, based on the predetermined label format, indicates a second hierarchical relationship between the third category and at least one other category;
   generating a unified event stream comprising the first event data structure and a second event data structure that includes the second content and the second label, the unified event stream comprising a common repository of multiple types of event data from multiple sources, wherein event data in the unified event stream share the predetermined label format for querying and comparing the event data;

determining a context of a mobile device;

based on the context, the first hierarchical relationship, and the second hierarchical relationship, determining at least one of the first content or the second content to present using the mobile device;

providing the at least one of the first content or the second content from the cloud computing system to the mobile device; and presenting, using the mobile device, the at least one of the first content or the second content.

* * * * *